(12) United States Patent
Kelso

(10) Patent No.: US 10,723,499 B2
(45) Date of Patent: Jul. 28, 2020

(54) AUTOMATED LABELING METHOD AND APPARATUS

(71) Applicant: NORTH ZION MANAGEMENT LLC, Damascus, OR (US)

(72) Inventor: Jamie Allen Kelso, Portland, OR (US)

(73) Assignee: NORTH ZION MANAGEMENT LLC, Damascus, OR (US)

( * ) Notice: Subject to any disclaimer, the term of this patent is extended or adjusted under 35 U.S.C. 154(b) by 0 days.

(21) Appl. No.: 15/996,049

(22) Filed: Jun. 1, 2018

(65) Prior Publication Data

US 2018/0290780 A1 Oct. 11, 2018

Related U.S. Application Data

(63) Continuation of application No. 14/562,448, filed on Dec. 5, 2014, now Pat. No. 10,000,308.

(51) Int. Cl.
| | |
|---|---|
| *B65C 9/00* | (2006.01) |
| *B65C 3/00* | (2006.01) |
| *B32B 38/00* | (2006.01) |
| *B65C 9/26* | (2006.01) |
| *B65C 9/18* | (2006.01) |
| *B65C 9/36* | (2006.01) |
| *B32B 38/04* | (2006.01) |
| *B32B 38/18* | (2006.01) |

(52) U.S. Cl.
CPC ............ *B65C 9/26* (2013.01); *B65C 3/00* (2013.01); *B65C 9/00* (2013.01); *B65C 9/1826* (2013.01); *B65C 9/36* (2013.01); *B32B 38/0004* (2013.01); *B32B 38/04* (2013.01); *B32B 38/1866* (2013.01); *B65C 9/1815* (2013.01); *Y10T 156/1062* (2015.01); *Y10T 156/1085* (2015.01); *Y10T 156/1317* (2015.01); *Y10T 156/1339* (2015.01); *Y10T 156/1746* (2015.01)

(58) Field of Classification Search
USPC ........................................................ 156/261
See application file for complete search history.

(56) References Cited

U.S. PATENT DOCUMENTS

| | | | | |
|---|---|---|---|---|
| 557,526 | A | * | 3/1896 | Egge ...................... B29C 51/16 156/261 |
| 2,033,553 | A | | 3/1936 | Scholl |
| 2,188,916 | A | | 2/1940 | Murch |
| 4,498,854 | A | | 2/1985 | Ross |
| 4,544,431 | A | | 10/1985 | King |
| 4,896,793 | A | | 1/1990 | Briggs et al. |
| 4,959,115 | A | | 9/1990 | Lacy |
| 5,788,284 | A | | 8/1998 | Hirst |
| 6,336,492 | B1 | | 1/2002 | Nagaoka |
| 7,021,353 | B2 | | 4/2006 | Constantine et al. |
| 7,168,472 | B2 | | 1/2007 | Hirst et al. |

(Continued)

FOREIGN PATENT DOCUMENTS

EP 577241 1/1994

*Primary Examiner* — Linda L Gray
(74) *Attorney, Agent, or Firm* — Garth Janke

(57) ABSTRACT

An automated labeling method and apparatus includes a label web-severing mechanism and a label-applying assembly, the web-severing mechanism configured to synchronously sever a plurality of labels from a self-wound label web, and the label-applying assembly configured to synchronously apply the plurality of severed labels to a corresponding plurality of articles to be labeled.

8 Claims, 14 Drawing Sheets

(56) References Cited

U.S. PATENT DOCUMENTS

| | | |
|---|---|---|
| 7,712,509 B2 | 5/2010 | Constantine |
| 8,464,771 B2 | 6/2013 | Howarth et al. |
| 8,570,356 B2 | 10/2013 | Tamkin et al. |
| 9,149,949 B2 | 10/2015 | Johnson et al. |
| 2007/0000592 A1 | 1/2007 | Fares et al. |

\* cited by examiner

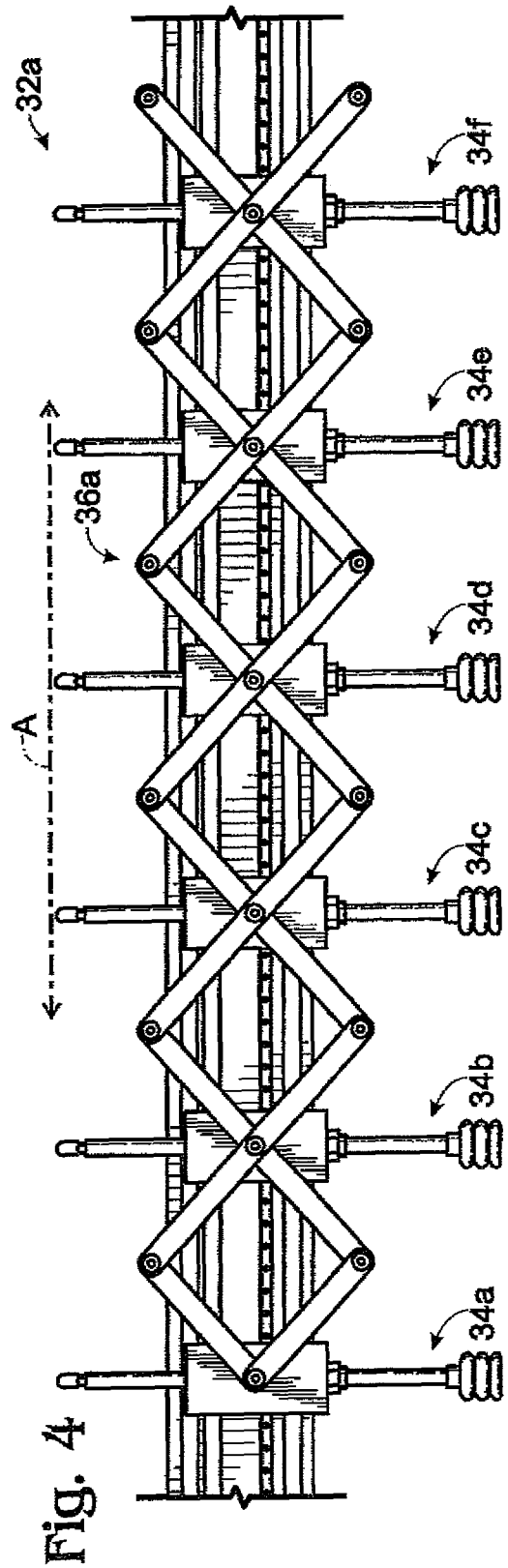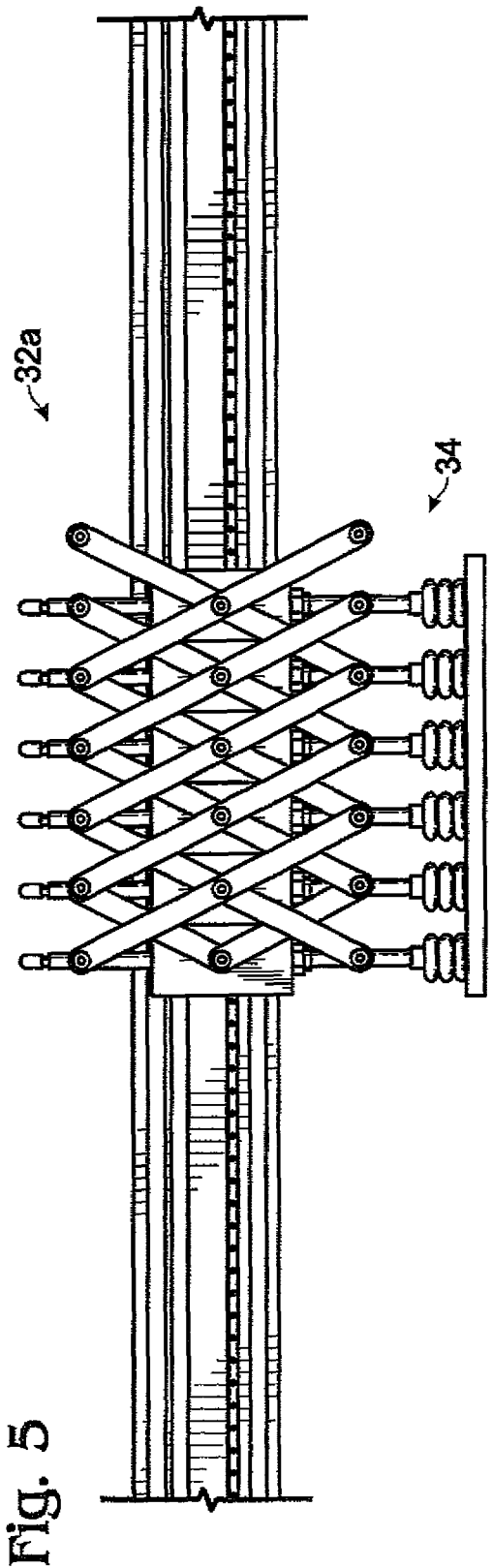
Fig. 4
Fig. 5

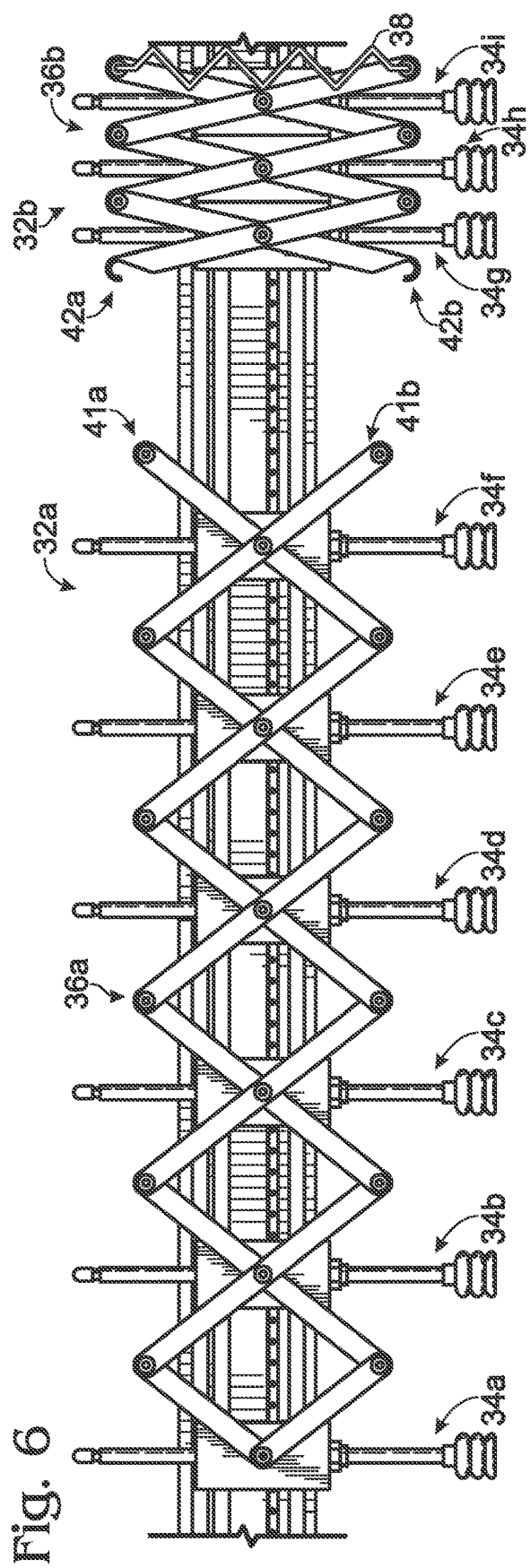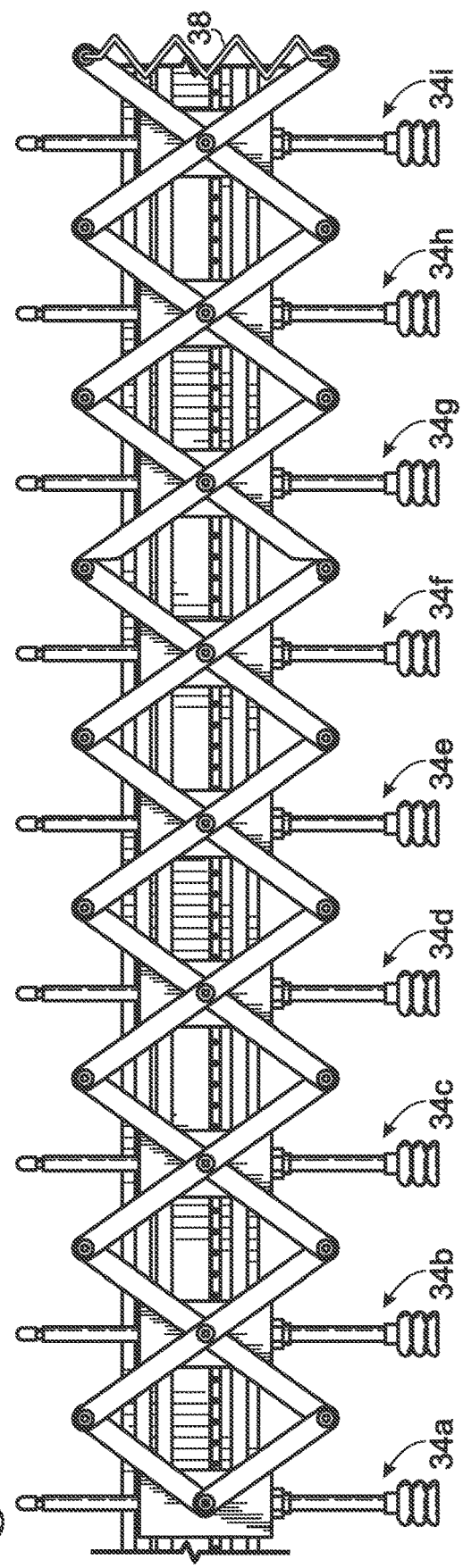

Fig. 11
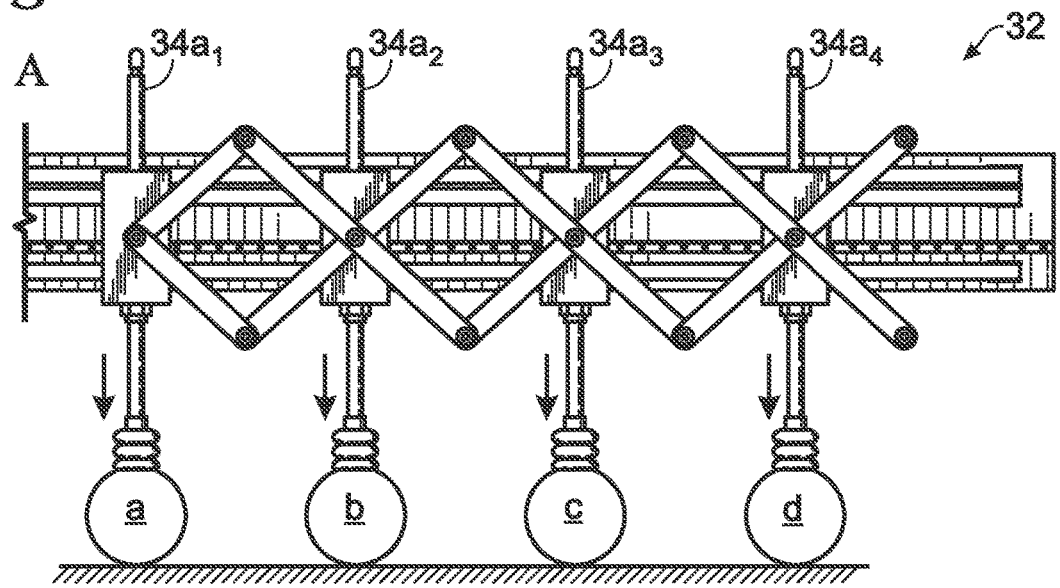
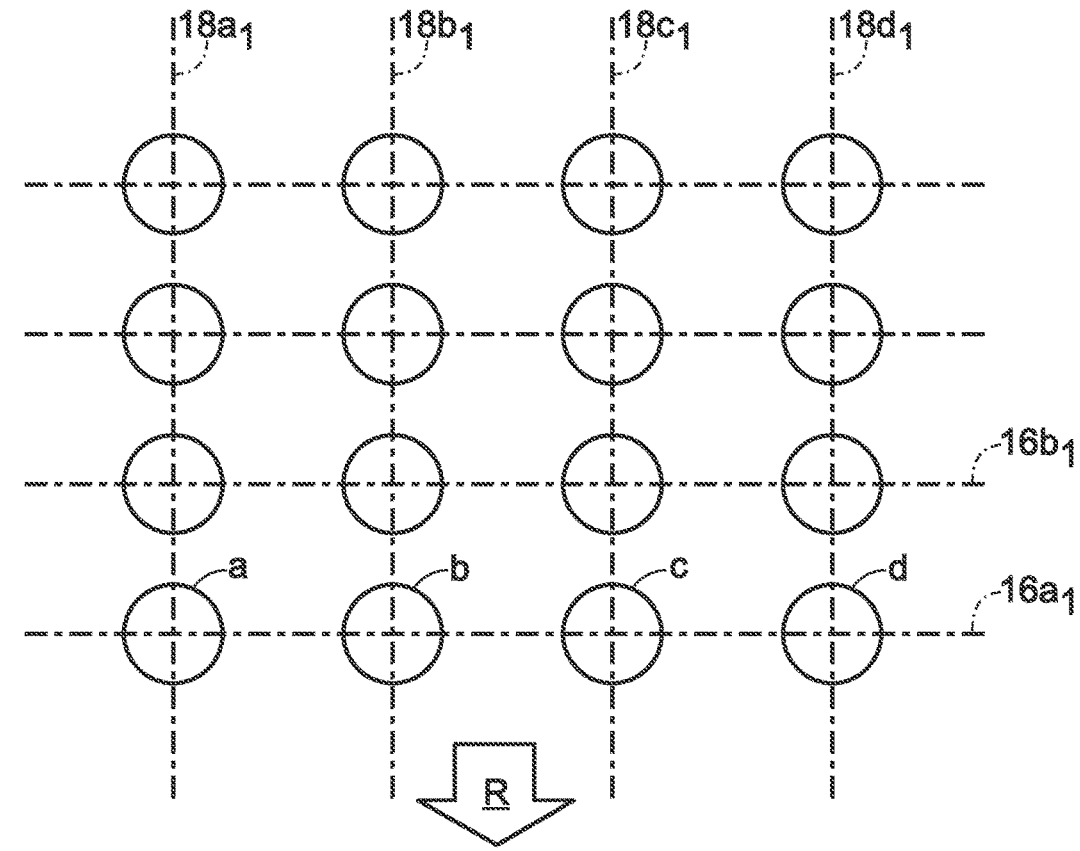

Fig. 12
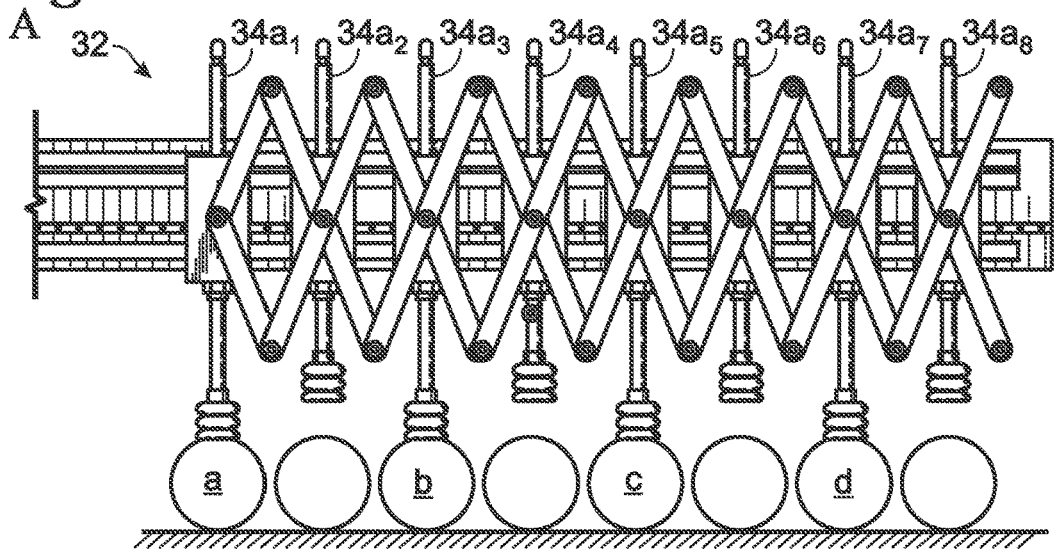
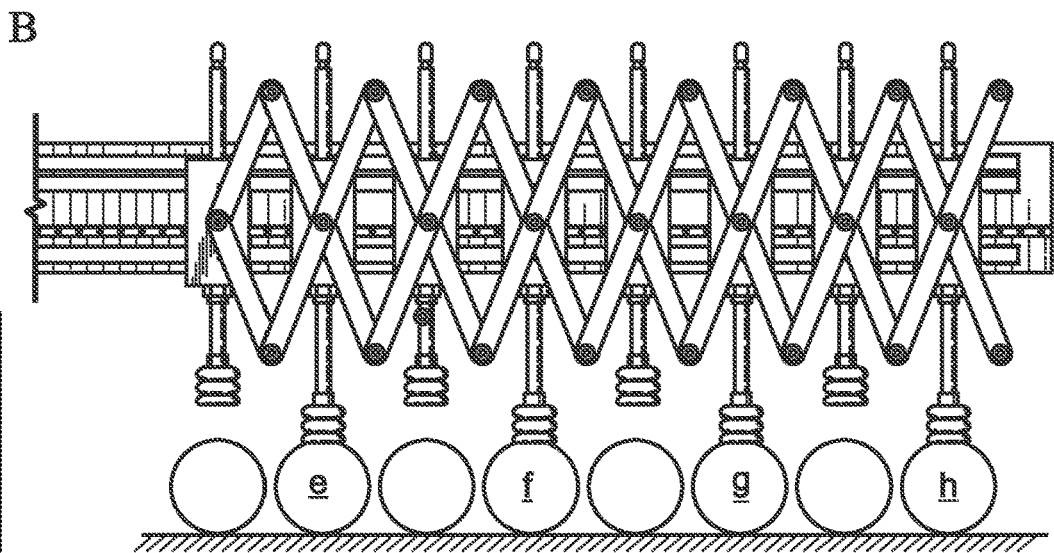
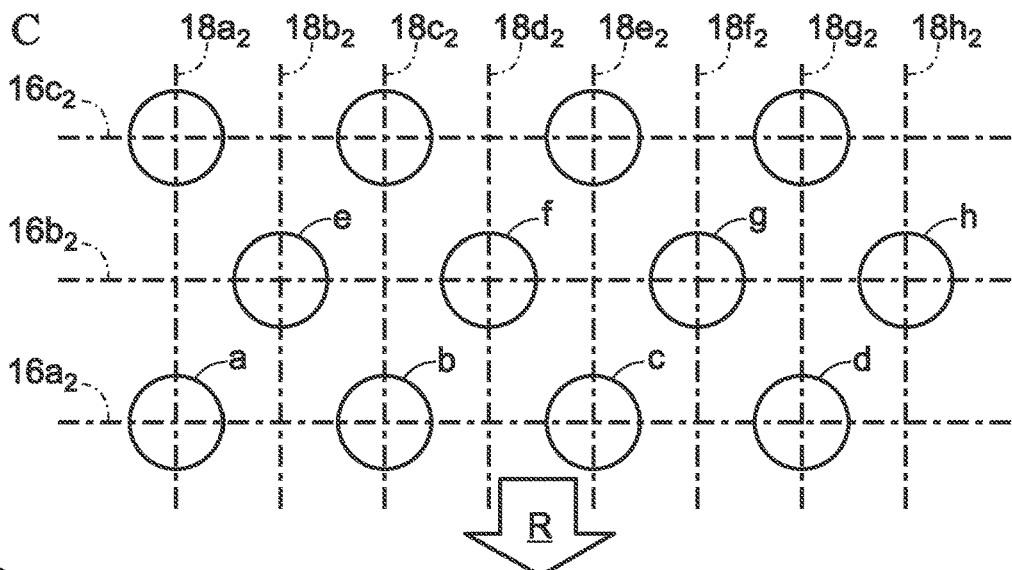

AUTOMATED LABELING METHOD AND APPARATUS

RELATED APPLICATION

The present application claims the benefit and priority of U.S. application Ser. No. 14/562,448, filed Dec. 5, 2014, the entirety of which is incorporated by reference herein.

FIELD OF THE INVENTION

The present invention relates to automated methods and apparatus for applying adhesive backed labels to articles, particularly singulated articles, and more particularly, singulated articles of produce.

BACKGROUND

Articles of produce are increasingly being individually labeled to facilitate inventory control and check-out at the grocery store. A commercially desirable method for labeling produce is to run the produce in volume through an automatic labeling apparatus, such as that described in U.S. Publication No. 2013/0011629, which applies adhesive backed labels to the articles.

The articles are carried past (typically underneath) the labeling apparatus on a conveyor in a "singulated" form, meaning that they are maintained on the conveyor in an ordered array. FIG. 1 shows an example, where articles 10 are held in respective wells 12 of a tray 14, that organizes the articles into discrete "rows" 16, and discrete "lanes" 18 on a conveyor 19. Other means for "singulating" the articles can be employed.

The lanes are defined in the direction of conveyance "R," and the rows are perpendicular to this direction.

Automatic labeling apparatus includes one or more label-applying heads for applying labels to the articles. Typically, where the articles are singulated and therefore restricted to travel in discrete lanes, there is one label-applying head per lane, for applying labels to all the articles within that lane. In such case, the conveyor travels at a steady speed and the articles are moving as they are being labeled. This methodology provides for highest throughput.

One known alternative that can be used where high throughput is not needed employs a single label-applying head that travels across the lanes, like the raster scan in a cathode ray tube, to apply labels to all the articles within each row. In this case the conveyor advances a row of articles to the label-applying head and stops. While the conveyor is stopped, the label-applying head travels across the lanes, momentarily stopping at each article within the row to apply a label to that article. When the label-applying head has finished labeling all the articles in the row, the conveyor restarts and the process is iterated.

Each label-applying head obtains the labels it applies in sequence from a "label supply" of label webbing (or "web") provided on a circumferentially wound "reel," like a magnetic tape or movie film reel. The web may have a "liner," which prevents the labels in one winding of the reel from adhering to the labels in adjacent windings. In such case, the labels must be removed at or near the label-applying head from the liner and the liner taken up and stored for ultimate discard. Alternatively, the web may be "liner-less" to avoid the need for handling and disposing of liner waste, in which case the non-adhesive side of the label is treated with an "adhesive resist" composition to perform the same function as the liner.

Each label-applying head has its own dedicated label supply. So when there are multiple label-applying heads, there are multiple label supplies that each need to be changed at periodic intervals.

SUMMARY

An automated labeling method and apparatus is disclosed herein.

A first aspect of the method provides for labeling articles by use of an automated labeling apparatus having a plurality of label-applying heads. In the first aspect of the method, the method includes steps of translating the plurality of label-applying heads to the labels, respectively collecting the labels with the label-applying heads, translating the label-applying heads with the collected labels to the articles, and applying the collected labels to the articles.

Where the articles are presented to the automated labeling apparatus arrayed in rows, the step of applying the collected labels to the articles may result in synchronously or substantially synchronously, or simultaneously or substantially simultaneously, applying labels to the articles in one row and/or may result in synchronously or substantially synchronously, or simultaneously or substantially simultaneously, applying labels to all the articles in the one row.

A second aspect of the method provides or severing labels from a label web in an automated apparatus. In the second aspect of the method, the method includes steps of starting an advancement of the label web, stopping the advancement, and while the advancement is stopped, synchronously severing at least two labels from the label web.

After the step of severing, the second aspect of the method may include re-starting the advancement.

The second aspect of the method may provide for labeling articles with the severed labels. For this purpose, where the automated labeling apparatus has a plurality of label-applying heads, the second aspect of the method may include translating the plurality of label-applying heads to the severed labels, respectively collecting the severed labels with the label-applying heads, translating the label-applying heads with the collected severed labels to the articles, and applying the collected severed labels to the articles.

Where the articles are presented to the automated labeling apparatus arrayed in rows, the step of applying the collected severed labels to the articles may result in applying labels to the articles in one row in synchrony and/or applying labels to all the articles in one row.

A third aspect of the method provides for an automated method for labeling of an article, including steps of severing a label from a label web, extending the end of a label-applying head to pick up the severed label, retracting the end of the label-applying head with the picked-up label, rotating the end of the label-applying head with the picked-up label, and extending the end of the label-applying head so as to apply the picked-up label to the article.

The third aspect of the method may include utilizing a web-severing mechanism for the step of severing, wherein the step of rotating includes rotating the end of the label-applying head about an axis that is parallel to a feed axis feeding the web through the web-severing mechanism.

A fourth aspect of the method provides for advancing a label web in an automated labeling apparatus in cycles, the method for advancing the web in one cycle including steps of gripping the label web with a gripping device at a first location in the automated labeling apparatus, first translating the gripping device with the label web gripped thereby from the first location to a second location spaced apart from the first location, releasing the label web from the grip of the gripping device at the second location, and second translating the gripping device back to the first location.

The fourth aspect of the method may include, after the step of releasing but before the step of second translating, a step of third translating the gripping device to a third location spaced apart from both the first and second locations, and may further include a step of pausing at the third location after the step of third translating but before the step of second translating.

Where the automated labeling apparatus is used for labeling articles conveyed by a conveyor, the step of first translating may translate the label web laterally relative to the conveying direction, or more particularly, perpendicular to the conveying direction.

Two consecutive cycles of the fourth aspect of the method may be performed, in which case the method may further include a step of selecting the second location in the second of the two consecutive cycles to be different from the second location in the first of the two consecutive cycles.

A fifth aspect of the method provides for labeling articles, and includes steps of synchronously or substantially synchronously, or simultaneously or substantially simultaneously, collecting a plurality of labels from a self-wound label web, and synchronously or substantially synchronously, or simultaneously or substantially simultaneously, applying the plurality of collected labels to a corresponding plurality of articles to be labeled, where the step of synchronously or substantially synchronously, or simultaneously or substantially simultaneously collecting may include synchronously or substantially synchronously, or simultaneously or substantially simultaneously, severing the plurality of labels.

A label-applying assembly for use in an automated labeling apparatus is provided for labeling articles arrayed on a conveyor in discrete spaced apart lanes oriented in a lane direction parallel to the conveying direction, and discrete spaced apart rows oriented in a laterally extending row direction at a non-zero angle relative to the lane direction.

The label-applying assembly includes an active label-applying assembly portion supporting a plurality of laterally spaced apart label-applying heads, each label-applying head of the active label-applying assembly portion configured to pick up a label at a respective label-receiving location and apply the label to a respective one of the articles in a row with the location of the article in the row generally being laterally spaced away from the respective label-receiving location, wherein the active label-applying assembly portion is configured to laterally translate the label-applying heads.

The active label-applying assembly portion may be configured to laterally translate at least one of the label-applying heads of the active label-applying assembly portion across at least two lanes.

Where the plurality of label-applying heads of the active label-applying assembly portion includes a laterally outermost label-applying head and a laterally innermost label-applying head, the active label-applying assembly portion may be configured to laterally translate the label-applying heads of the active label-applying assembly portion together by driving the laterally outermost label-applying head and the laterally innermost label-applying heads in the same direction.

The label-applying assembly may include a docking label-applying assembly portion configured for automatically selectable connection to and disconnection from the active label-applying assembly portion, the docking label-applying assembly portion having at least one label-applying head configured, when the docking label-applying assembly portion is connected to the active label-applying assembly portion, to pick up a label at a respective label-receiving location and apply the label to a respective one of the articles in a row with the location of the article in the row generally being laterally spaced apart from the respective label-receiving location, and wherein the docking label-applying assembly portion is configured, when the docking label-applying assembly portion is connected to the active label-applying assembly portion, to laterally translate the at least one label-applying head of the docking label-applying assembly portion as a result of translation of the label-applying heads of the active label-applying assembly portion by the active label-applying assembly portion.

The label-applying assembly may further include an automatically engagable locking mechanism configured to lock the docking label-applying assembly portion in a docked configuration, laterally spaced apart from the active label-applying assembly portion, when the docking label-applying assembly portion is disconnected from the active label-applying assembly portion.

The docking label-applying assembly portion may have a plurality of label-applying heads, wherein, in the docked configuration of the docking label-applying assembly portion, the label-applying heads thereof have minimum spacings therebetween, as compared to the spacings between the label-applying heads of the docking label-applying assembly portion when the docking label-applying assembly portion is connected to the active label-applying assembly portion.

In any embodiment of the label-applying assembly, the active label-applying assembly portion may be configured to adjustably increase and decrease the lateral spacings between adjacent label-applying heads of the active label-applying assembly portion, and may more particularly be configured to do so by driving the laterally outermost label-applying head and the laterally innermost label-applying heads in opposite directions. In either case, the active label-applying assembly portion may be configured to maintain laterally equidistant spacings between adjacent label-applying heads of the active label-applying assembly portion.

A label web-severing mechanism is provided for severing a two-sided label web in an automated labeling apparatus for labeling articles. The web-severing mechanism may, although it need not necessarily, be utilized in cases where the articles are arrayed on a conveyor for conveying the articles, wherein the feed axis is disposed laterally relative to the conveying direction.

The web-severing mechanism includes a body portion, at least three severing elements supported by the body portion that are spaced apart from each other along a feed axis for feeding the web through the web-severing mechanism with the at least three severing elements being disposed toward one of the sides of the label web, and at least one pressure-applying element member supported by the body portion disposed toward the other of the sides of the label web and configured for cyclically squeezing the web between the at least one pressure-applying element and the at least three severing elements sufficiently to sever at least two labels from the web.

The body portion may include at least two apertures connected to a source of vacuum for maintaining the at least two severed labels at the body portion.

The web-severing mechanism may be configured to cause the at least one pressure-applying member to produce a moving pressure front on the label web across the severing elements.

The web severing apparatus as described above may be provided in combination with the label-applying assembly as described above.

In another aspect of the labeling apparatus, a web-severing mechanism and a label-applying assembly are provided, where the web-severing mechanism is configured to synchronously or substantially synchronously, or simultaneously or substantially simultaneously, sever a plurality of labels from a self-wound label web, and the label-applying assembly is configured to synchronously or substantially synchronously, or simultaneously or substantially simultaneously, apply the plurality of severed labels to a corresponding plurality of articles to be labeled.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

BRIEF DESCRIPTION OF THE DRAWINGS

FIG. 4 is a front elevation view of a label-applying assembly according to the present invention in an expanded configuration.

FIG. 5 is a front elevation view of the label-applying assembly of FIG. 4 in a contracted configuration.

FIG. 6 is a front elevation view of the label-applying assembly of FIGS. 4 and 5 along with a docking label-applying assembly according to the present invention in a docked configuration.

FIG. 7 is a front elevation view of the label-applying assembly and docking label-applying assembly of FIG. 6 in a joined configuration.

FIG. 8 portions B-D are side elevations of the label-cutting block of FIG. 8 portion A, showing a temporal sequence of movement of selected elements of the label-cutting block.

FIG. 11 portion A is a front elevation of a label-applying assembly according to the present invention applying labels to articles of produce according to a first mode of operation of the invention suitable for use when the articles are arrayed in un-staggered rows.

FIG. 11 portion B is a plan view of the articles as they are presented to the label-applying assembly of FIG. 11 portion A.

FIG. 12 portions A and B are front elevations of a label-applying assembly according to the present invention applying labels to articles of produce according to a first method of performing a second mode of operation of the invention suitable for use when the articles are arrayed in staggered rows, where the rows are staggered by ½.

FIG. 12 portion C is a plan view of the articles as they are presented to the label-applying assembly of FIG. 12 portions A and B.

FIG. 13 portion B is a front elevation of the label-applying assembly shown in portion A of FIG. 13, showing the labeling of a second row of the articles.

FIG. 13 portion C is a front elevation of the label-applying assembly shown in portion A of FIG. 13, showing the labeling of a third row of the articles.

FIG. 13 portion D is a plan view of the articles as they are presented to the label applying assembly of FIG. 13 portions A-C.

FIG. 14 portion B is a front elevation of the label-applying assembly shown in portion A of FIG. 14, showing the label-assembly shifted relative to its position in portion A of FIG. 14 for labeling a second row of the articles.

FIG. 14 portion C is a plan view of the articles as they are presented to the label-applying assembly of FIG. 14 portions A and B.

DETAILED DESCRIPTION OF PREFERRED EMBODIMENTS

Figure 1:
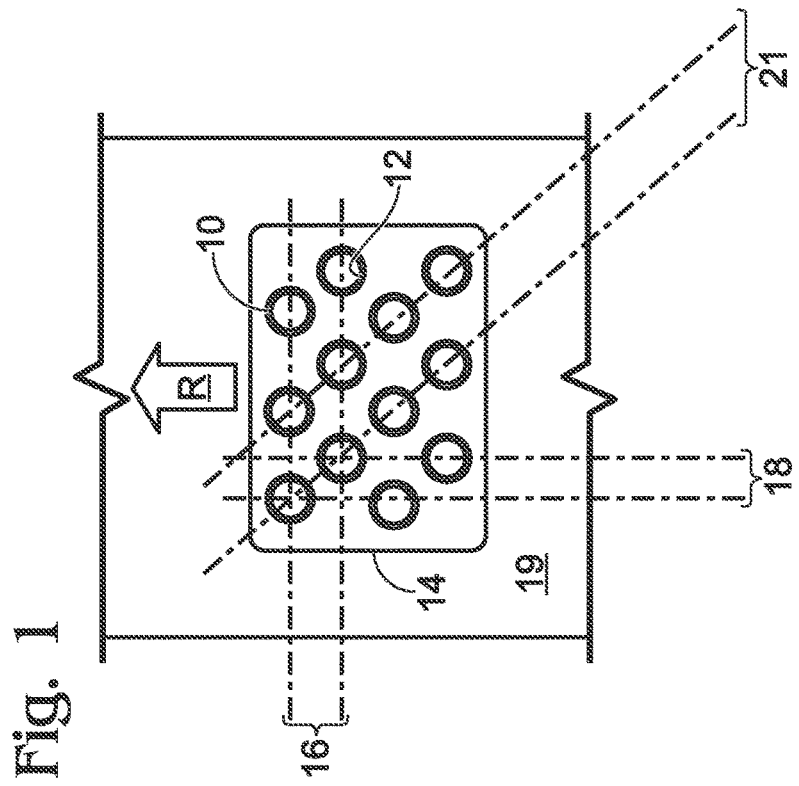
FIG. 1 is an elevation view of a tray of articles of produce on a conveyor.

FIG. 1 shows an exemplary context for use of the present invention, where there are a number of articles of produce 10 to be labeled, the articles being organized into an ordered array such as by the use of a tray 14 have regularly spaced wells 12, defining discrete lanes and rows as noted above having regular spacings. The articles travel on a conveyor 19 in a direction "R," with lanes 18 aligned in the same direction.

Typically the rows are perpendicular to the direction R as for the rows 18, but it may be noted that the lines indicated as 21 could also be rows according to the present invention, with a row being defined as any straight line crossing the conveyor that would intersect a space adapted for singulating an article (such as one of the wells 12) in each of the lanes, i.e., without skipping a lane. In general, a row can be at any non-zero angle relative to the direction of conveyance of the articles by the conveyor, but preferably the angle is no more than the 45 degrees indicated for the lines 21 in FIG. 1.

Herein the terms "lateral" and "laterally" are defined to refer to directions parallel to the rows, which may in general be at any non-zero angle relative to the direction of the lanes, such as the approximately 45 degrees shown for the lines indicated as 21, but which are typically at an angle of 90 degrees.

Figure 2:
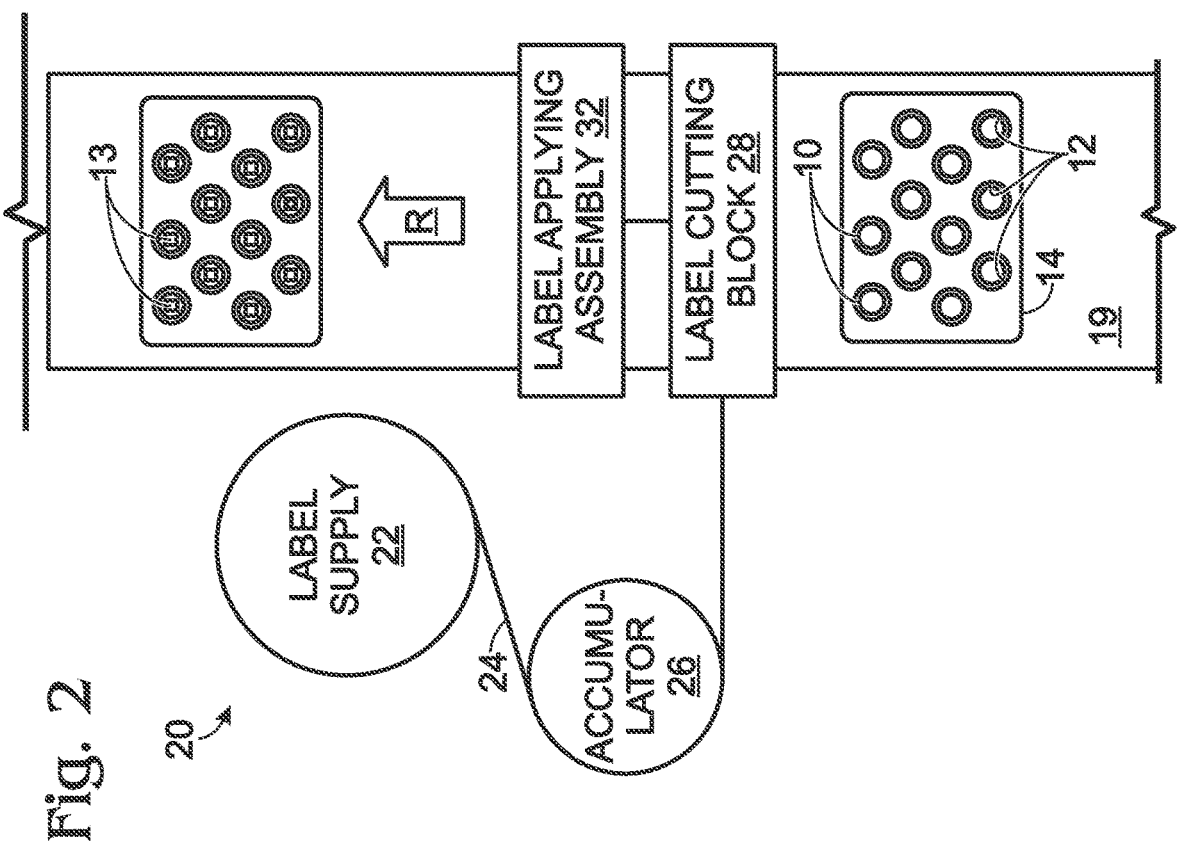
FIG. 2 is a schematic view of a labeling apparatus according to the present invention.

FIG. 2 is a schematic view of an automated labeling apparatus 20 according to the present invention for applying labels to the articles as shown and presented for labeling in FIG. 1. Thus the term "label" as used herein refers to the finished label product that is applied to the article being labeled.

The apparatus 20 includes a label supply 22 from which the apparatus draws, which may be by any known means, a web 24 of labels, a printer 25 for printing "variable" or article-specific information on the web so as to define individual labels, an accumulator 26 that acts as a buffer between the rate the labels are drawn from the label supply and the rate they are being applied to the articles, a label-cutting block 28 for cutting individual labels 13 from the web 24, and a label-applying assembly 32 for applying the labels to the articles.

Figure 3:
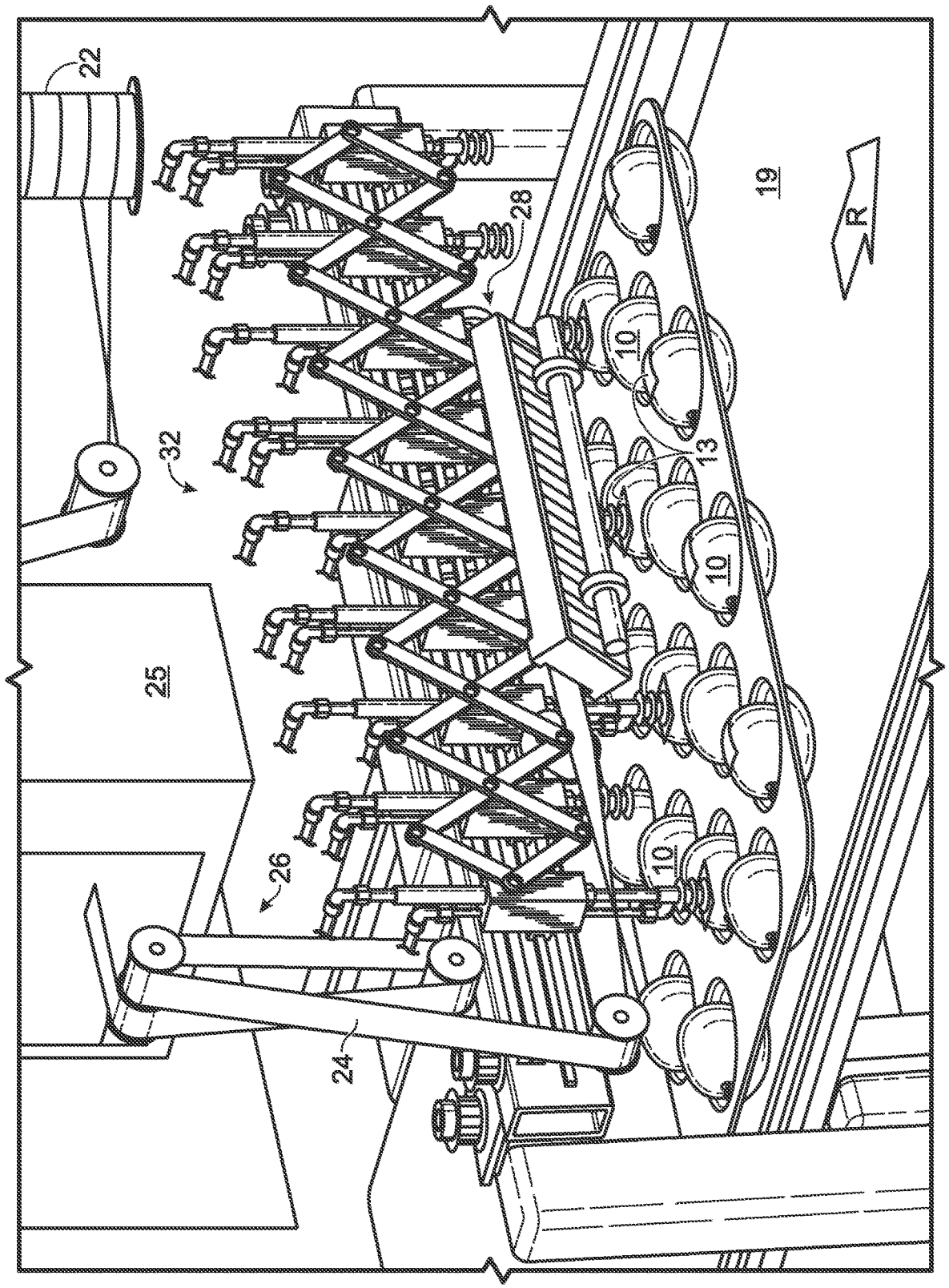
FIG. 3 is a front isometric view of the labeling apparatus of FIG. 2.

Although FIG. 2 is a schematic view, some physical relationships are indicated; particularly, those shown in FIG. 1 and those between the label-cutting block 28, the label-applying assembly 32, and the conveyor 19. FIG. 3 provides a physical view of the labeling apparatus 20. As an overview, the label-applying assembly 32 allows for multiple label-applying heads to draw from a single label supply 22, and the label-cutting block 28 provides for detaching multiple labels from the web 24 simultaneously.

FIG. 4 shows, apart from any other features of the apparatus 20 for clarity, an "always active" portion of the label-applying assembly 32, or "active label-applying assembly" 32a, having a plurality of label-applying heads 34. More particularly, the active label-applying assembly 32a is shown in a laterally "expanded" configuration, where the label-applying heads are spaced apart from one another along an axis "A" that is parallel to the rows 16, which is generally used for applying labels to the articles; and FIG. 5 shows the active label-applying assembly 32a in a laterally "contracted" configuration, in which the label-applying heads 34 are spaced closer together, which is generally used for picking up or collecting cut labels from the label-cutting block 28.

Six label-applying heads 34 are shown, namely 34a-34f. Each label-applying head is connected to an adjacent label-applying head via a first scissors-type linkage assembly 36a, which allows the label-applying heads 34a-34f to move apart from one another, or toward one another, all the while maintaining equilateral spacings between them.

The linkage assembly 36a provides for maintaining equidistant spacings between the label-applying heads because there are, typically, equidistant spacings between the articles. If the spacings between the articles are not equidistant, but they are regular, then either or both of the scissors-type linkage assemblies can be modified to accommodate the varying spacings by appropriate shortening or lengthening of the linking members.

The label-applying heads at the ends of the active label-applying assembly 32a, namely, the label-applying heads 34a and 34f in this example, are connected to respective driving mechanisms allowing for independently driving the heads 34a and 34f laterally, along the axis A parallel to the rows 16, to allow for both laterally expanding or contracting the assembly, and/or laterally translating the entire assembly in either direction. Such driving mechanisms can be provided in a number of different ways as will be readily appreciated by persons of ordinary skill; one way is to attach the label-applying heads 34a and 34f to respective belts aligned along the axis A, parallel to the rows 16, each belt being independently driven by a respective feedback controlled electric motor.

With reference to FIG. 6, showing the active label-applying assembly 32a in a less laterally expanded configuration than that shown in FIG. 4 but not as contracted as shown in FIG. 5, the active label-applying assembly 32a has the capability to automatically selectably connect to and disconnect from a "docking" label-applying assembly 32b of the label-applying assembly 32, disposed in laterally side-by-side relation. This allows for increasing the number of active label-applying heads, and thus the number of lanes that the label-applying assembly 32 is able to service.

FIG. 6 shows the active label-applying assembly 32 with the six label-applying heads 34a-34f detached from a docking label-applying assembly 32b having three label-applying heads 34g-34i, the docking label-applying assembly 32b being shown in a "docked" configuration positioned off to the side of the active label-applying assembly 32a. The label-applying heads 34g-34i of the docking label-applying assembly 32b are connected to each other via a second scissors-type linkage assembly 36b which is just like the first scissors-type linkage assembly 36a except that adjacent ends of the two scissors-type linkage assemblies are adapted with complementary features for engaging and disengaging the two linkage assemblies.

The second scissors-type linkage assembly 36b, like the first scissors-type linkage assembly 36a, is capable of lateral expansion and contraction; however, contraction is resisted by a spring bias applied by one or more springs 38 tending to expand the linkage assembly 36b. This allows for maintaining a joinder of the two linkage assemblies 36a and 36b, where hooked ends 42a and 42b of the second linkage assembly are forced to clamp down on corresponding pins 41a and 41b of the first linkage assembly as shown in FIG. 7. In this joined configuration of the always active and docking portions of the label-applying assembly 32, the two scissors-type linkage assemblies function as one, increasing the total number of active label-applying heads in the label-applying assembly 32 from six to nine in this example.

From the joined configuration of the always active and docking portions of the label-applying assembly 32 shown in FIG. 7, the docking label-applying assembly 32b can be returned to the docked position shown in FIG. 6. That is, the label-applying heads 32a and 32f are driven towards one another against the spring bias of the one or more springs 38, to produce a laterally "contracted" configuration of the label-applying assembly 32 in which the label-applying heads are forced, against the spring bias of the one or more tension springs 38 of the docking label-applying assembly, to come into close proximity to each other, preferably making side-by-side contact with minimum spacing and maximum contraction, such as shown in FIG. 6.

In addition, the heads 34a and 34f are driven in unison to laterally translate the label-applying assembly 32 toward one side of the conveyor where the docking label-applying assembly 32b will be docked. Once the docking label-applying assembly 32b reaches the docking location, it can be held there against the spring bias of the one or more springs 38 by a number of automatically engageable locking means, such as by operation of one or more solenoids to drive one or more pins into respective holes in one or more of the label-applying heads 34g-34i.

Referring back to FIG. 6, in the docked position of the docking label-applying assembly 32b the "jaw" defined between the hooked ends 42a and 42a thereof is wide open. This allows for the always active label-assembly 32a to depart from the docked docking assembly 32b by expanding, thereby moving the pins 41a and 41b closer together and releasing them from the grip of the hooked ends 42a and 42b, and thereby allowing the always active label-applying assembly 32a to depart from the docking label-applying assembly 32b, whereupon contracting the label-applying assembly 32 is no longer met with the resistance of the one or more springs 38.

The process just described can be reversed for joining the always active label-applying assembly 32a with the docking label-applying assembly 32b for re-use of the docking label-applying assembly.

Figure 8:
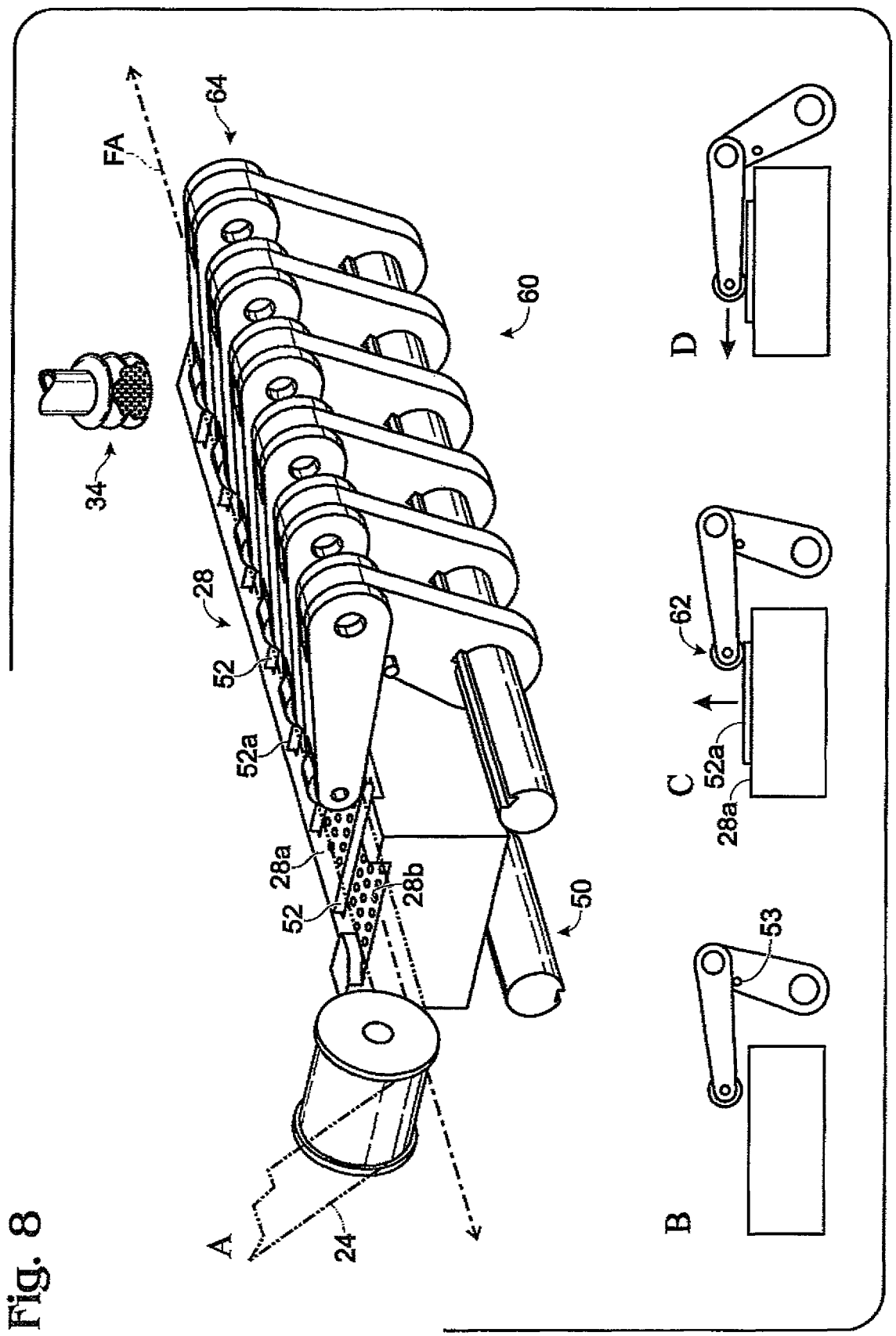
FIG. 8 portion A is a front isometric view of a label-cutting block according to the present invention.

FIG. 8 shows the label-cutting block 28 and a portion of the label web 24, along with a portion of one of the label-applying heads 34 for reference. The label-cutting block 28 is provided for cutting the labels to be applied by the label-applying assembly 32 from the web 24. More generally, its purpose is to "sever" the labels, cutting being just the preferred form of severing.

The label-cutting block 28 has a top surface 28a that is shown as being horizontal in FIG. 8 but which is preferably tilted from the horizontal in the apparatus 20 as will be explained further below. The web 24 is drawn across and slightly above the top surface 28a with the adhesive side down, along the axis A parallel to the rows 16, i.e., laterally across the conveyor in the typical embodiment being described here. The web travel is momentarily paused for simultaneously cutting a plurality of label portions from the web. The label-cutting block 28 includes two main systems for cutting the label portions, a cutting-blade system 50 and a cutting-pressure-applying system 60.

The cutting-blade system 50 includes a plurality of cutting blades 52 having cutting edges 52a. The cutting blades are adapted to be raised and lowered in a repetitive cycle having a period defined by the time the conveyor takes to travel the distance between two rows. More particularly, the cutting edges are raised in the direction indicated by the arrow in the portion C of FIG. 8 to an elevation above the top surface 28a so that they are available for making contact with the underside of the web when web travel is paused for cutting, and are thereafter lowered to an elevation at or below the top surface (such as indicated by comparison of the portion C with the portion B of FIG. 8) where they will no longer make contact with the underside of the web after cutting is complete and web travel is resumed. Such cyclic raising and lowering of the cutting blades can be provided in a number of different ways as will be readily appreciated by persons of ordinary skill; one way is to drive the cutting blades with a camshaft. Timing for the camshaft can be provided by use of a rotary encoder mounted to the conveyor.

The cutting-pressure-applying system 60 includes one or more freely turning rollers 62 and a linkage mechanism 64 for moving the rollers both vertically and horizontally. The linkage mechanism 64 moves the rollers in repetitive cycles, with a cycle having the same timing as that for raising and lowering the cutting blades 52. First, the rollers 62 are maintained by pins 53 in a holding disposition above the surface 28a as shown in the portion B of FIG. 8. Then, the cutting edges 52a of the cutting blades 52 are raised sufficiently above the surface 28a to force the web against the rollers 62, squeezing the web between the cutting edges and the rollers. The portion C of FIG. 8 shows the relative positions of the cutting edges and the rollers with the web omitted for clarity. Note that contact between the cutting edges and the rollers would occur but for the presence of the web between them. Thence, the rollers 62 are caused to roll across the web parallel to the cutting edges 52a as indicated by the arrow in the portion D of FIG. 8, applying a moving wave-like front of pressure over the lengths of the cutting edges, sufficient to sever the label portions from the web. Finally, the rollers are retracted back to the holding disposition.

Such cyclic movement of the rollers 62 can be provided in a number of different ways as will be readily appreciated by persons of ordinary skill; one way is to drive the linkage mechanism 64 with the same camshaft used for driving the cutting blades 52.

As an alternative to raising and lowering the cutting blades 52, the blades can be fixed in place with the cutting edges above the top surface 28a, yet spaced from the underside of the web until the linkage mechanism 64 forces the web down to meet the cutting edges by application of the rollers 62.

The web 24 travels over the top surface 28a of the label-cutting block 28 adhesive side down, and so it travels slightly above the top surface to avoid sticking. However, the label-cutting block 28 includes apertures 28b through the top surface 28a through which a vacuum can be applied to the web, for holding the cut labels to the surface 28a until they can be picked up or collected by the label-applying heads as discussed further below. To minimize sticking between the cut labels and the top surface 28a as a result of the application of the vacuum, the top surface 28a may be formed of, or may include, a surface layer of a low surface energy material such as polypropylene, or adhesive resist, and/or may define peaks and valleys to minimize the contact area. Some degree of sticking is tolerable; however, and could even be used to advantage. For example, instead of using a vacuum to hold the labels in place for pick up or collection by the label-applying heads, the cutting-pressure-applying system 60 could be adapted, or an additional system could be provided, for pressing the labels onto the top surface 28a after the labels have been cut.

Figure 9:
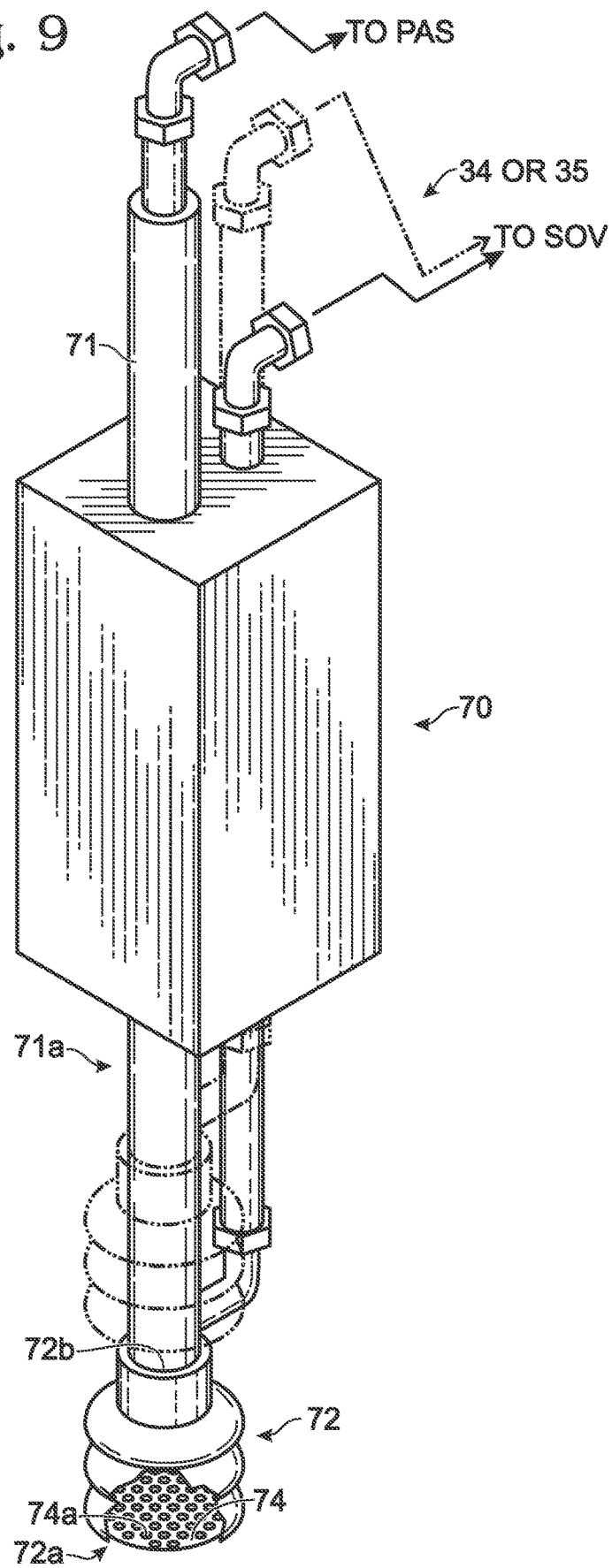
FIG. 9 is an isometric view of a label-applying head according to the present invention, for use in the label-applying assembly of FIGS. 4-7, and which may also be used as a label-gripping head according to the present invention.

The label-cutting block 28 cuts enough labels to supply the active label-applying heads of the label-applying assembly 32. The label-applying assembly 32 is laterally translated, and/or contracted, as needed to move the active label-applying heads into position over the respective cut labels. To transfer the cut labels from the label-cutting block 28 to the active label-applying heads, each label-applying head 34 has an air cylinder 70 carrying an elastically collapsible member such as a bellows 72 as shown in FIG. 9.

The bellows 72 is a standard part affixed with a novel airflow restriction plate 74 secured to an end 72a of the bellows. The restriction plate 74 has a number of airflow restricting apertures 74a therethrough, and the bellows has a vacuum inlet aperture 72b in switchable connection (switch not shown) to a source of vacuum "SOV."

The air cylinder 70 has a piston 71, an exposed end 71a of which can be either extended or retracted by operation of a switchable connection (switch not shown) to a pressurized air supply "PAS." The bellows 72 is connected to the exposed end 71a of the piston. The air cylinder drives the bellows down so that the end 72a of the bellows makes contact with the cut label, whereupon or wherebefore the vacuum is shut off from the label-cutting block 28, and whereupon or whereafter vacuum is applied to the vacuum inlet aperture 72b of the bellows sufficient to overcome any adhesion between the adhesive side of the label and the top surface 28a of the label-cutting block, thus capturing a cut label.

The air cylinder 70 is then controlled by switching the source of pressurized air to cause the piston to retract sufficiently to absorb the compliance of the bellows and ensure that the end 72a has sufficient clearance for the label-applying head to swing away from the label-cutting block without interference. To understand this motion requires some additional explanation.

Figure 10:
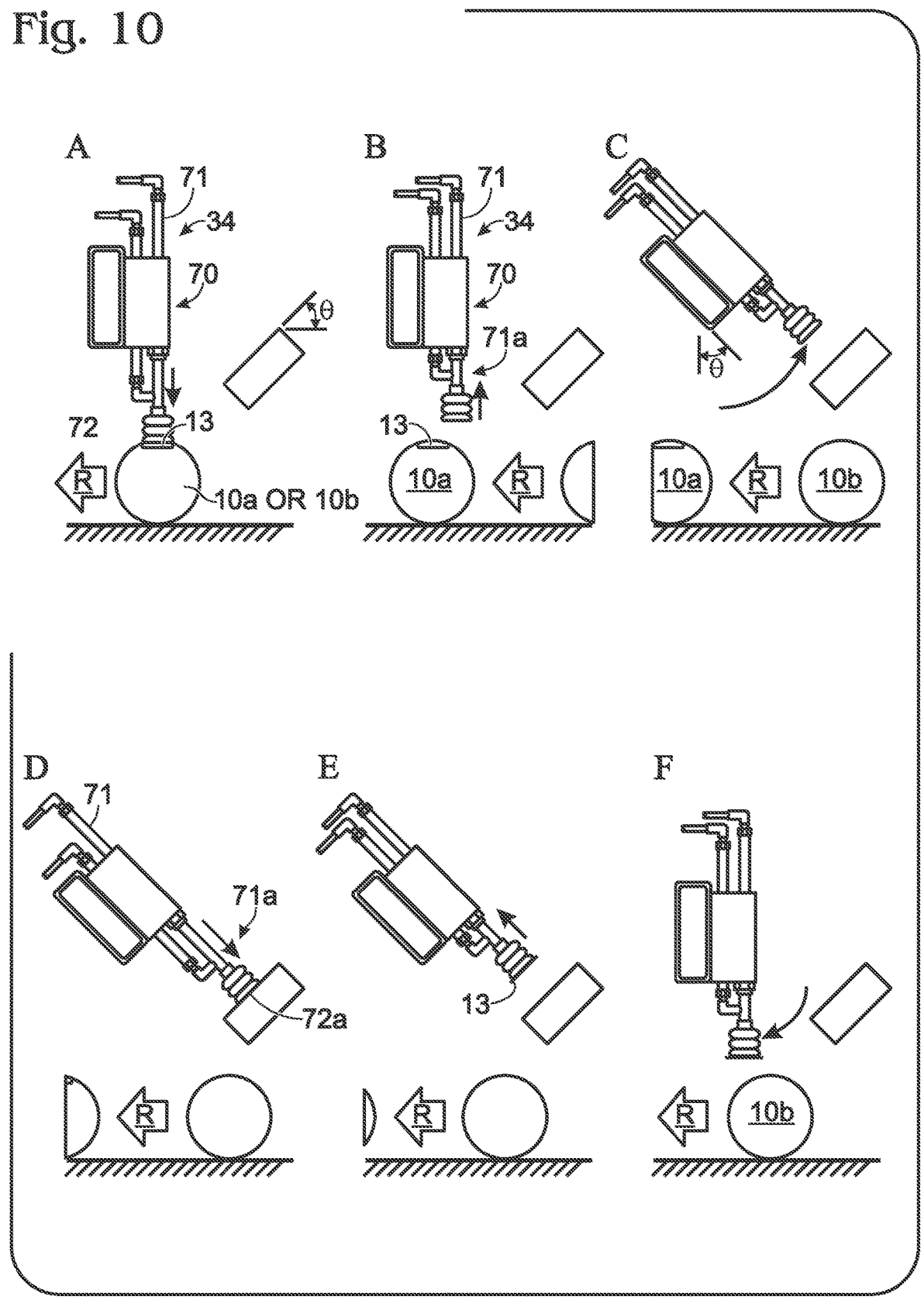
FIG. 10 portions A-F are side elevations of the label-applying head of FIG. 9 and the label-cutting block of FIG. 8 portion A showing a temporal sequence of movement of the label-applying head relative to the label-cutting block.

FIG. 10 shows the label-cutting block 28 in relation to the label-applying assembly 32 and the conveyor 19, in a temporal sequence of movement of the label-applying assembly 32 shown by dividing FIG. 10 into portions A-F.

In the portion A of FIG. 10, the label-applying head 34 is completing an act of applying a label to a first article of produce 10a. The bellows has been placed in a first extended disposition, whereby the end 72a of the bellows is able to contact the article, by extending the end 71a of the piston 71 by suitable switching of the pressurized air supply. A label 13 is disposed between the end 72a of the bellows 72 and the article.

In the portion B of FIG. 9, the bellows is being placed in a retracted disposition by retracting the exposed end 71a of the piston 71 of the air cylinder 70 in the direction indicated by the arrow by suitable switching of the pressurized air supply.

Turning next to the portion C of FIG. 10, either before, during or after the bellows is retracted as indicated in the portion B, the label-applying assembly 32 is caused to rotate in the plane of the Figure, perpendicular to the axis A shown in FIG. 4, which is perpendicular to the rows 16, and which is typically but not necessarily parallel to the conveyor direction R. The amount of rotation is indicated by an angle θ, which is the angle the top surface 28a of the label-cutting block 28 makes with the horizontal as shown in the portion A of FIG. 10. This rotation orients the direction of travel of the bellows perpendicular to the top surface 28a of the label-cutting block 28, which is optimum for picking up or collecting a cut label. The amount of retraction of the bellows that was needed to allow for this rotation can be small, e.g., it may be just enough to allow the bellows to clear the top surface 28a of the label-cutting block 28 on which the cut labels (not shown) lie.

Now, with the bellows above the label web, the bellows is placed into a second extended disposition, whereby the end 72a of the bellows is able to contact the cut label, again by extending the end 71a of the piston 71 by suitable switching of the pressurized air supply. Again, the label cannot be seen, it being understood that it is disposed between the end 72a of the bellows 72 and the surface 28a of the label-cutting block 28.

Before or after contact is made between the end 72a of the bellows and the cut label, vacuum is applied to the bellows by suitable switching of the source of vacuum, exposing the cut label to a vacuum at the restriction plate 74 shown in FIG. 9, and overcoming the vacuum applied through the apertures 28b of the label-cutting block 28, if any, so that the label-applying head 34 captures the label.

After capturing the label, the bellows is placed once again in the retracted disposition to allow for clearing the label-cutting block 28, and is thereafter rotated back through the angle θ shown in the portion C of FIG. 10 to reach the orientation shown in the portion F, which is the same as shown in the portion B, in which the direction of travel of the bellows is vertical, which is normally optimum for applying the label to the article.

Before, during or after this rotation, the bellows is also placed once again in the first extended disposition for applying the label to a next article of produce 10b that followed the first article of produce 10a. This action is shown only partially completed in the portion F of FIG. 10, with completion of this action being shown in the portion A, where the extension of the bellows 72 is impacting the article, and the vacuum has been, is being, or will be removed from the bellows in preparation for the label-applying head proceeding to pick up or collect another label by repeating the steps shown in the portions B-F.

The portions A-F of FIG. 10 show a label collecting and applying cycle for a single label-applying head for simplicity. It should be noted that there are a plurality of label-applying heads in the label-applying assembly 32, and that the label-applying assembly 32 is laterally expanding and contracting in and out of the plane of the Figure, along the axis A and parallel to the rows 16 as described above, during this cycle. In particular, the label-applying assembly 32 is laterally expanding while it is being re-oriented from the orientation shown in the portion E of FIG. 10 as it moves through the orientation shown in the portion F to reach the orientation shown in the portion. A, and it is laterally contracting while it is being re-oriented from the orientation shown in the portion A as it moves through the orientation shown in portion B to reach the orientation shown in the portion C.

Returning briefly to FIG. 8, portion A, the web travels along a feed axis "FA" for feeding the web through the label-cutting block 28. This feed axis is perpendicular to the plane of FIG. 10, and is therefore parallel to the axis A (See FIG. 4) of lateral expansion and contraction of the label-applying assembly 32, which is parallel to the rows 16. To the extent the feed axis is not parallel to rows 16, the label-applying assembly 32 would need to rotate in a plane parallel to the surface of the conveyor 19 in addition to laterally expanding and contracting, which would require additional time for no purpose and which would therefore be undesirable. Accordingly, it is preferred to have the feed axis be at least "substantially parallel" to the rows, which for purposes herein is defined as being within 10 degrees, more preferably within 5 degrees, and most preferably within 1 degree.

The tilting of the label-cutting block 28 by the angle θ provides for an advantage of allowing the label-applying heads 34 to move between the locations at which they apply the labels to the locations at which they pick up or collect the labels most efficiently. This angle is preferably in the range 45 degrees+/−15 degrees, more preferably 45 degrees+/−10 degrees, and most preferably 45 degrees+/−5 degrees.

The label-cutting block 28 is preferably located within the footprint of the conveyor 19, such as shown in FIGS. 2 and 3, to facilitate access to the conveyor by workers loading the conveyor with articles to be labeled, to minimize floor space, and to minimize the lateral travel required of the label-applying heads. To further minimize the lateral travel required of the label-applying heads, the label-cutting block 28 is preferably centered over the conveyor.

Though the provision of a docking portion of the label-applying assembly 32 can eliminate the need for this, there may be more label-applying heads in the active portion 32a of the label-applying assembly 32 than are actually needed. In such case, the additional label-applying heads will be at that end of the active label-applying assembly that is opposite the end adapted to join with the parkable label-applying assembly 32b, and any such additional heads will be ignored for purposes of defining two distinct modes of operation of the label-applying assembly 32.

FIGS. 11 and 12 show physical circumstances that call for the two different modes of operation. FIG. 11 portion B shows a circumstance where the rows are aligned. Here, if there are X articles in a row, there X lanes. Shown is X=4, with four articles "a," "b," "c," and "d" in a first row $16a_1$, which are shown being labeled in portion A of FIG. 11, and four more articles in a second row $16b_1$, in four lanes $18a_1$, $18b_1$, $18c_1$, and $18d_1$, waiting to be labeled after the articles in the first row have been labeled and the conveyor has advanced the second row into position under the label-applying assembly 32.

In contrast, FIG. 12 portion B shows a circumstance where the rows are staggered; particularly, the rows are staggered in this example by ½ the spacing between the articles in a row (e.g., ½ the spacing between articles "a" and "b" in the row 16a). Here, if there are X articles in a row, there are 2X lanes. Again, shown is X=4, with four articles "a," "b," "c," and "d" in a first row $16a_2$, and four more articles "e," "f," "g," and "h" in a second row $16b_2$, in eight lanes $18a_2$, $18b_2$, $18c_2$, $18d_2$, $18e$, $18f$, $18g$, and $18h$.

Portion A of FIG. 12 shows four label-applying heads $34a_1$, $34a_3$, $34a_5$, and $34a_7$ applying labels to the articles of the first row as the first row is positioned under the label-applying assembly 32. The remaining label-applying heads $34a_2$, $34a_4$, $34a_6$, and $34a_8$ are retracted, but ready to apply labels to all the articles of the second row after the articles of the first row have been labeled and the conveyor has advanced the second row into position under the label-applying assembly 32.

An additional row $16c_2$ is also shown in the portion B of FIG. 12. The row $16c_2$ is aligned with the row $16a_2$, so that the configuration of the label-applying assembly 32 shown in the portion A of FIG. 12 for labeling the articles in the first row $16a_2$ is the same as that for labeling the articles in the third row $16c_2$.

In what may be referred to as "mode 1" of operation of the label-applying assembly 32, for use in the circumstance illustrated in FIG. 11, each active label-applying head applies a label in each row, i.e., the aforedescribed collecting and applying cycle is repeated after one row; whereas in the second mode of operation referred to as "mode 2," for use in the circumstance illustrated in FIG. 12, every other one of the active label-applying heads applies a label in a first row, and the remaining half of the active label-applying heads apply labels in the immediately following row, the cycle being repeated after two rows.

The rows can be staggered by amounts different from half the spacing between the articles in a row. For example, FIG. 13 portion D shows rows that are staggered by ⅓. Here, if there are X articles in a row, there are 3X lanes. Again, shown is X=4, with four articles "a," "b," "c," and "d" in a first row $16a_3$, four articles "e," "f," "g," and "h" in a second row $16b_3$, and four articles "i," "j," "k," and "l," in a third row $16c_3$, in twelve lanes.

Figure 13:
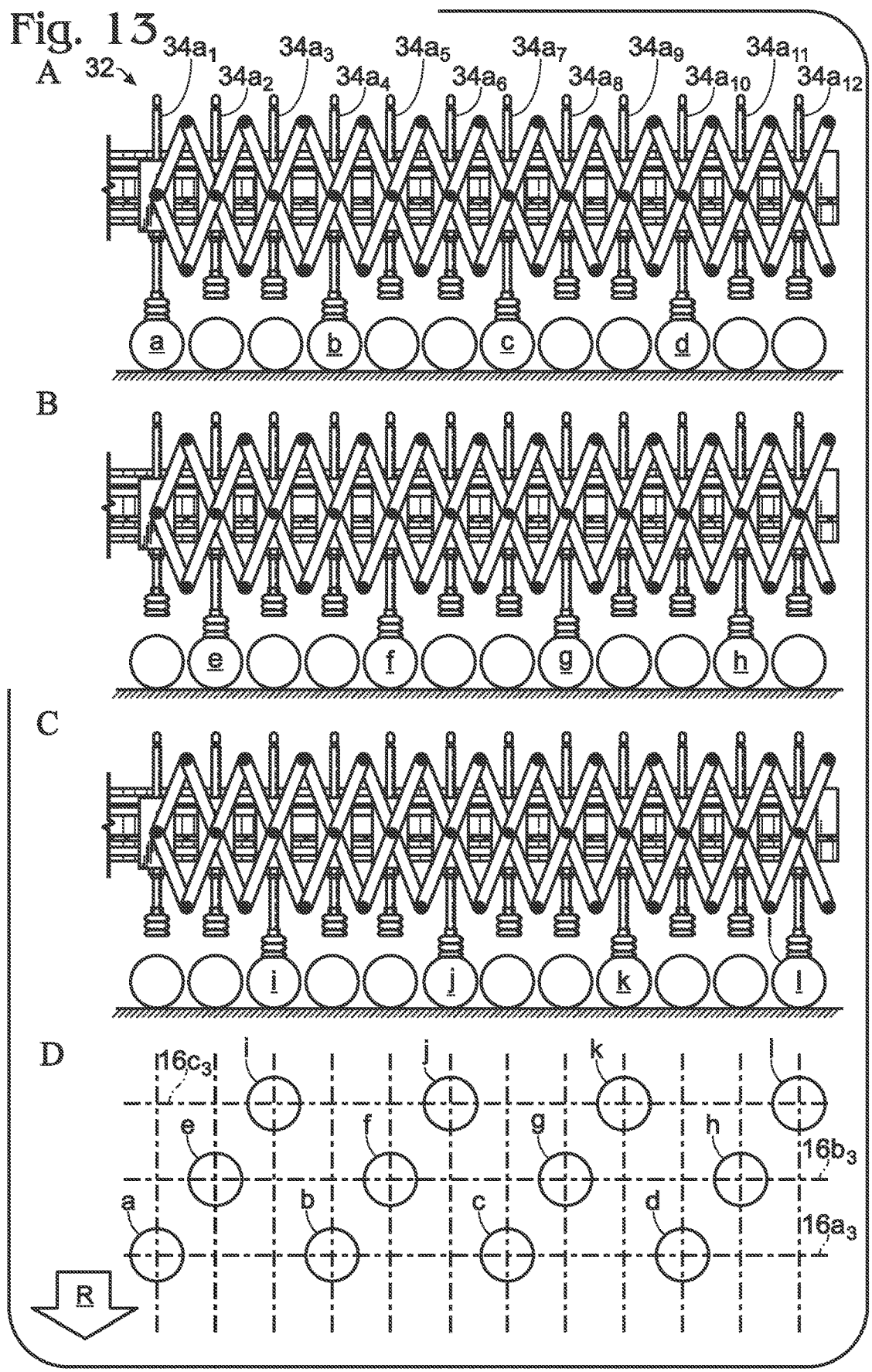
FIG. 13 portion A is a front elevation of a label-applying assembly according to the present invention applying labels to articles of produce according to the first method of performing the second mode of operation of the invention referred to in connection with FIG. 12, where the rows are staggered by ⅓, showing the labeling of a first row of the articles.

Not shown is a fourth row, which would be aligned with and therefore appear identical to, the first row; also, because the fourth row is aligned with the first row, the configuration of the label-applying assembly 32 for labeling the fourth row would appear identical to that shown in the portion A of FIG. 13 for labeling the first row.

Using the same methodology as described in connection with FIG. 12 extended to an additional row, in one collecting and applying cycle the label-applying heads $34a_1$, $34a_4$, $34a_7$, and $34a_{10}$ apply labels to the articles of the first row as the first row is positioned under the label-applying assembly 32; the label-applying heads $34a_2$, $34a_5$, $34a_8$, and $34a_{11}$, apply labels to the articles of the second row after the first row is moved into position under the label-applying assembly 32; and the label-applying heads $34a_3$, $34a_6$, $34a_9$, and $34a_{12}$ apply labels to the articles of the third row after the third row is moved into position under the label-applying assembly, the collecting and applying cycle being repeated after three rows of articles have been labeled commencing with the fourth row.

From these examples it may be appreciated that modes 1 and 2 can be generalized as being "modes N," where the label-applying assembly will return to the label-cutting block 28 to pick up or collect more labels after N rows of articles have been labeled.

However, in any mode N where N=2 or more, a label collecting and applying cycle may be less than N. For example, portion C of FIG. 14 shows just two of the rows $16a_3$ and $16b_3$ that were shown in the portion D of FIG. 13, to show how when N=3 a label collecting and applying cycle may be repeated after two rows.

In FIGS. 12 and 13, the center of gravity of the label-applying assembly 32 remains fixed during the time the labels are being applied to the articles being labeled in a single label collecting and applying cycle. But in FIG. 14, it is shifted laterally during this time; particularly, the label-applying assembly first labels the articles "a," "b," "c," and "d" of the first row $16a_3$ with the label-applying heads $34a_1$, $34a_3$, $34a_5$, and $34a_7$" as shown in the portion A of FIG. 13, after which the label-assembly 32 is shifted laterally in portion B of FIG. 13, for labeling the articles "e," "f," "g," and "h" in the second row $16b_3$ with the label-applying heads $34a_2$, $34a_4$, $34a_6$ once the conveyor has advanced the second row into position under the label-applying assembly 32.

Comparing FIG. 12 and FIG. 13 shows that, whereas in FIG. 12 the rows are staggered by ½ and the label-applying assembly 32 labels the articles in two rows before going back to the label-cutting block 28 to get more labels, in FIG. 13 the rows are staggered by ⅓ and the label-applying assembly 32 labels the articles in three rows in a single label collecting and applying cycle. More generally, where the rows are staggered by 1/K, K rows may be labeled in a single label collecting and applying cycle.

Figure 14:
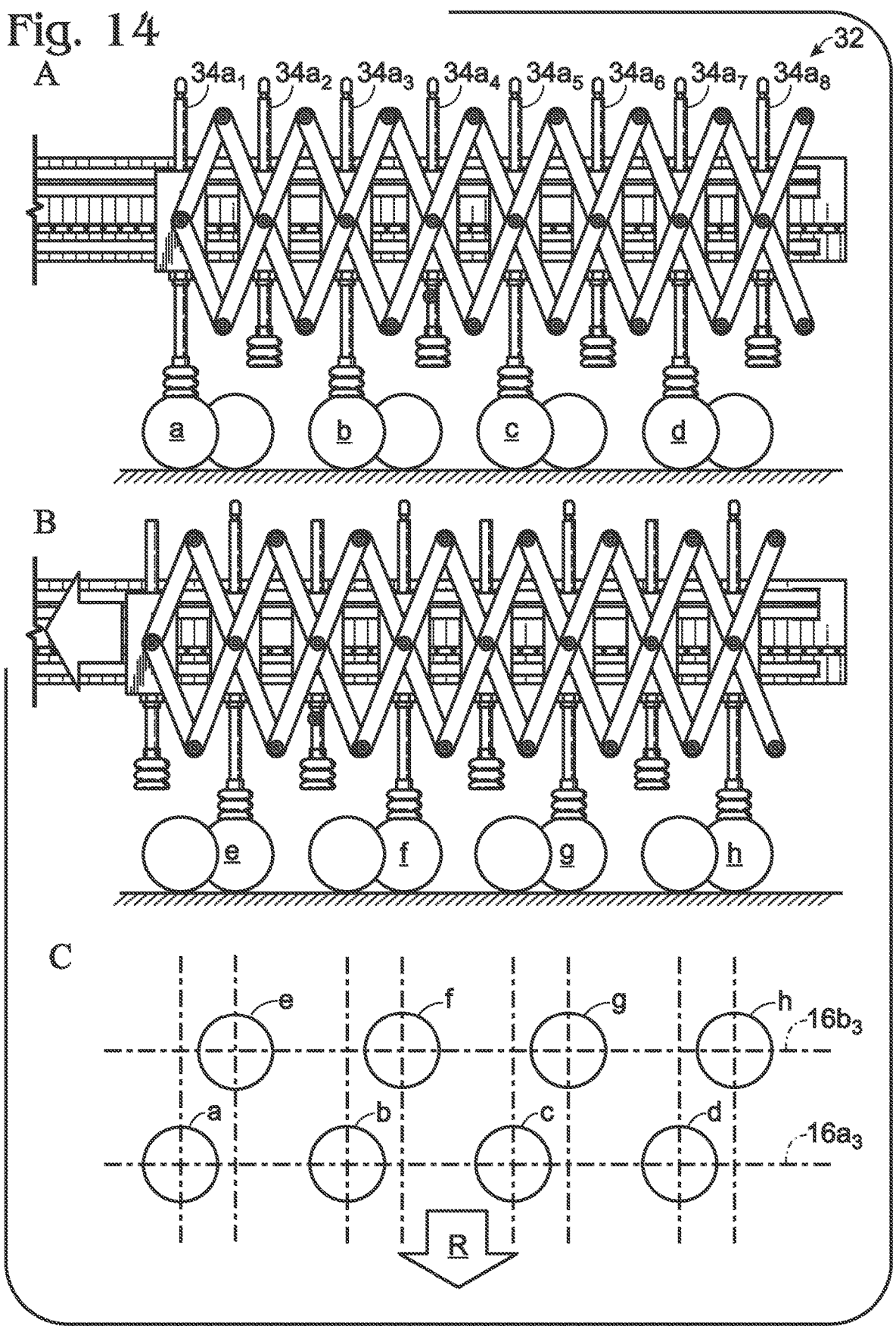
FIG. 14 portion A is a front elevation of a label-applying assembly according to the present invention applying labels to articles of produce according to a second method of performing the second mode of operation of the invention referred to in connection with FIG. 12, showing the labeling of a first row of the articles.

Comparing FIG. 13 and FIG. 14 shows that, when the rows are staggered by ⅓, an alternative to labeling all three rows of articles in one label collecting and applying cycle without shifting the label-applying assembly 32 is to limit the cycle to two rows and shift the label-applying assembly 32 during the cycle. More generally, when the rows are staggered by 1/K, where K is an integer that is greater than or equal to 3, an alternative to either labeling K rows of articles or just one row of articles in a single label collecting and applying cycle, enabled by the capability to laterally shift the label-applying assembly 32, is to label M rows in a single label collecting and applying cycle, where M is an integer that is greater than or equal to 2 but less than K (so if K is 3, M can be 2; whereas if K is 4, M can be either 2 or 3).

It is another outstanding advantage of the present invention that only one label web is required for use in the labeling apparatus 10, so that one label supply 22 can serve all the label-applying heads 34. Taking advantage of this feature, the label supply 22 may be a level wound spool, rather than a circumferentially wound reel as in the prior art, which will typically have more than ten times the storage capacity of the prior art reel.

The label web 24 may be drawn from the label supply 22 by any standard means, such as by use of one or more drive rollers, preferably at constant speed. On the other hand, the web is repetitively started and stopped at the label-cutting block 28; hence, the accumulator 26 acts as a buffer between the label supply and the label-cutting block.

To advance the web at the label-cutting block in starts and stops, an additional label-applying head 34 may be used, which may have the same structure as shown in FIG. 9, and which may be driven just like the label-applying heads 34a and 34f. For purposes of the discussion here, the label-applying head 34 will be referred to as a label-gripping head 35.

Figure 15:
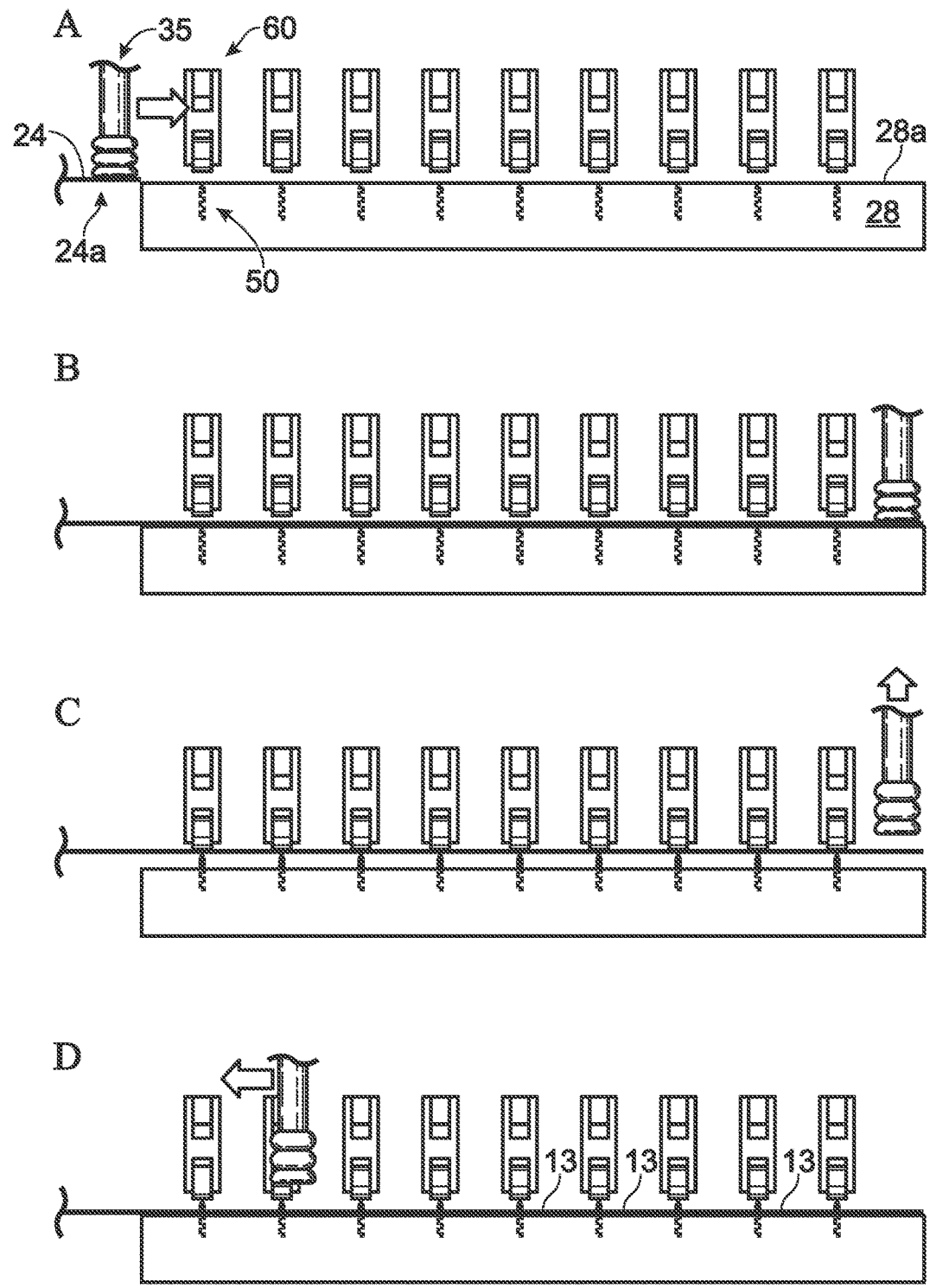
FIG. 15 portions A-D are rear elevations of the label-gripping head of FIG. 9 in relation to the label-cutting block of FIG. 8, portions A-D, showing a temporal sequence of movement of the label-gripping head relative to the label-cutting block.

FIG. 15 is divided into four portions A-D showing a temporal sequence of operation of the label-gripping head 35. The label-cutting block 28 is shown with nine identical elements each of the cutting-blade system 50 and the cutting-pressure-applying system 60, corresponding to the six label-applying heads of the active label-applying assembly 32a, plus the three label-applying heads of the docking label-applying assembly 32b that may be employed in addition.

In the portion A of FIG. 15, the label-gripping head 35 is shown in relation to an end 24a of the web 24. The end 24a represents the end of the label web after the label-cutting block 28 has cut some labels, and the label-applying assembly 32 has picked up or collected the labels and removed them from the surface 28a. The bellows is extended, in the manner discussed above in connection with FIG. 10 for the label-applying head 34, while a vacuum is applied to the bellows so that the end of the bellows makes contact with the end 24a and the bellows grips the label.

In the portion B of FIG. 15, the label-gripping head 35 is driven laterally across the surface 28a of the label-cutting block, stopping after pulling the web past a predetermined number of the elements of the cutting-blade system 50 and the cutting-pressure-applying system 60. The predetermined number of cutting-blade and cutting-pressure-applying elements is that which is needed for cutting the required number of labels, which may be less than the nine elements that are available in this example.

In the portion C of FIG. 15, the vacuum has been shut off from the bellows of the label-gripping head 35 so that the label-gripping head is no longer gripping the label web, and the bellows is retracted, in the manner discussed above in connection with FIG. 10 for the label-applying head 34, to allow clearance for the cutting-blades 52 of the cutting-blade system 50 to raise the web against the rollers 62 of the cutting-pressure-applying system 60, for cutting the web into the individual labels.

In the portion D of FIG. 15, the cutting-blades 52 are shown still raised, but the cut labels have fallen, or are pulled by a vacuum through the apertures 28b, or may otherwise be caused to rest on the surface 28a, ready for pick-up or collection. The portion D shows the label-gripping head 35 being driven back to the location shown in portion A; however, this transit could also be performed during the step depicted in portion C.

An electronic controller (not shown) may be used to control the amount of translation of the web 24 by the label-gripping head 35, again, depending on the number of labels to be cut, along with the timing for applying and ceasing to apply the vacuum, allowing for varying these conditions as desired. Alternatively, limit switches may be used to sequence the operation of the web translation in time with the operation of the label-applying assembly 32 and the label-cutting block 28.

While FIG. 15 shows a vacuum driven bellows-type label-gripping device, other gripping means could be used. Also, while the bellows-type label-gripping device is particularly adapted to avoid contact with the adhesive on the label web 24 by gripping the web on one side only, namely, on the non-adhesive side, other gripping means that grip both sides of the web could be used if the web has patterned adhesive.

Figure 16:
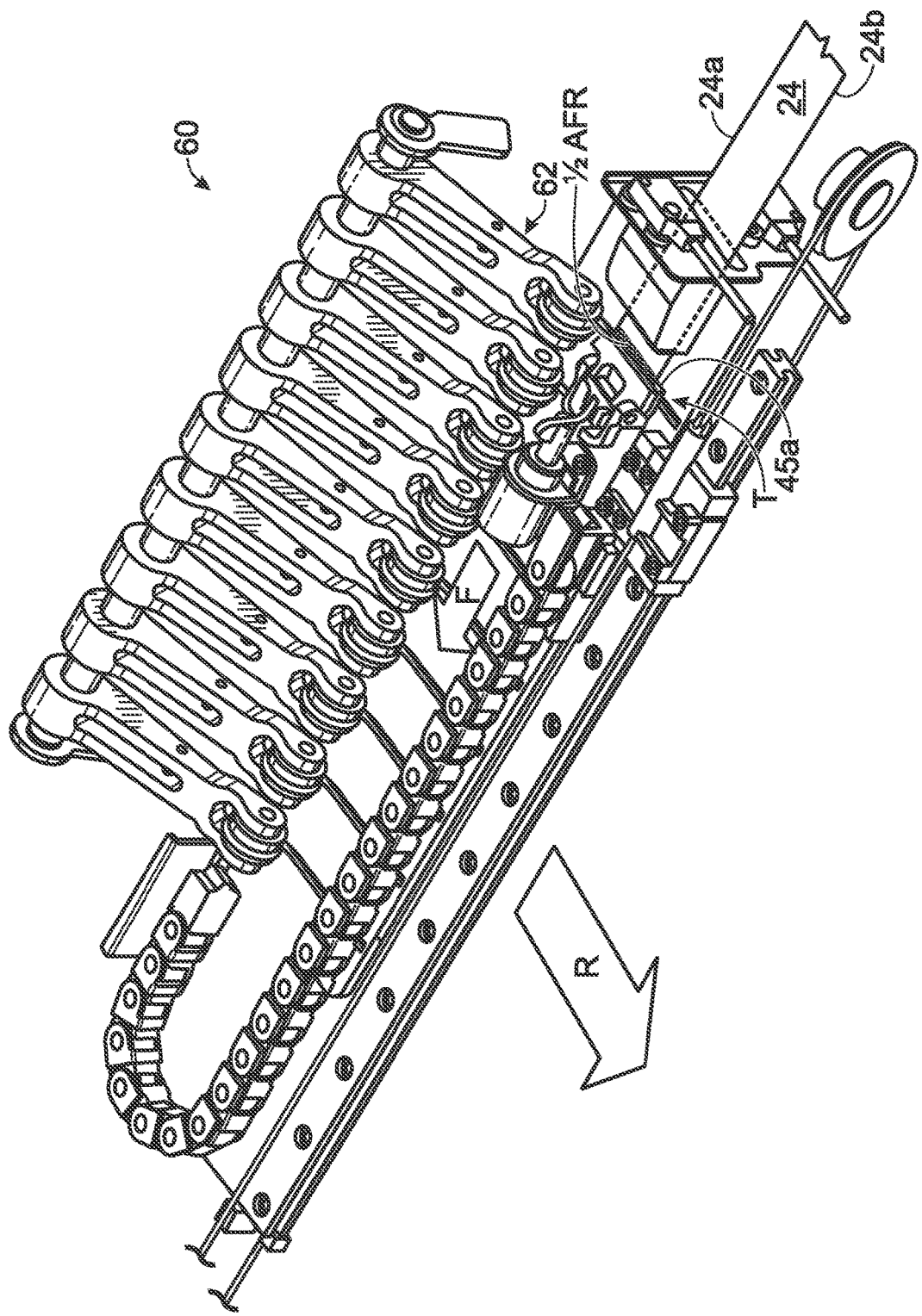
FIG. 16 is an isometric view of a preferred label-gripping head according to the present invention and portions of the label-cutting block of FIG. 10, showing the label-gripping head gripping a web in anticipation of pulling the web through the label-cutting block.
Figure 17:
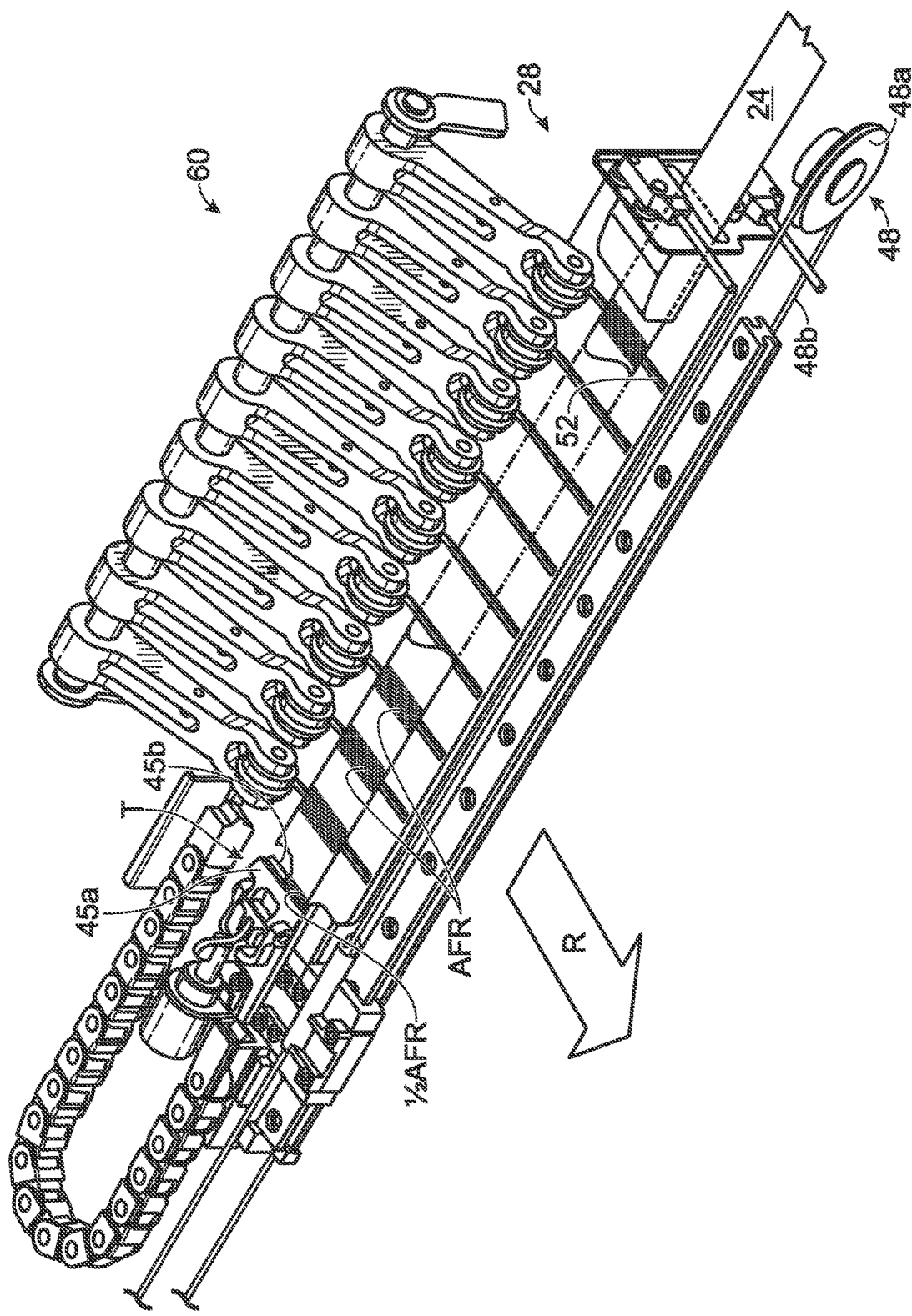
FIG. 17 is an isometric view of the label-gripping head and label-cutting block of FIG. 16, showing the label-gripping head after having pulled the web through the label-cutting block.

FIGS. 16 and 17 show such a label-gripping head 45. With particular reference to FIG. 17, the web 24 has adhesive-free regions "AFR," it being understood that the adhesive is, and therefore the adhesive-free regions are, on the underside of the web in the view shown, in the vicinity of the cutting-blades 52. The adhesive-free regions are provided to avoid fouling the cutting-blades with adhesive when the individual labels 13 are cut from the web by the label-cutting block 28.

The label-gripping head 45 has opposable upper and lower jaws 45a and 45b respectively for gripping both sides of a web, the lower jaw 45b making contact with the web in an adhesive-free region. More particularly, each cutting-blade 52 will preferably sever the web through an adhesive-free region, leaving half of the adhesive-free region on one side of the cutting-blade and the other half of the adhesive-free region on the other side of the cutting-blade. So the lower jaw 45b makes contact with half of an adhesive-free region ("½ AFR") remaining at the terminus "T" of the web 24 after all the individual labels 13 for use in a single label collection and applying cycle have been severed from the web.

FIG. 16 shows the label-gripping head 45 gripping the web after such time, at the right of the Figure, and FIG. 17 shows the label-gripping head 45 after having pulled the web 24 to the left along the feed axis in the feed direction "F" shown in FIG. 16, to position the web for another cutting cycle.

The label-gripping head 45 is driven back and forth between the positions shown in FIGS. 16 and 17 by a drive mechanism 48 including a pulley 48a and a cable 48b driven by an electric motor (not shown), e.g., a stepper motor. The drive mechanism 48 may be the same as that used for driving the bellows-type label-gripping head 35, and/or for driving each of the label-applying heads 32a and 32f of the label-applying assembly 32 as explained above, or other equivalent mechanisms may be used. The drive mechanism 48 may be controlled to pull the web variable distances, to allow for selecting the number of labels to be utilized in a given label collecting and applying cycle.

The adhesive-free regions AFR are shown in FIGS. 16 and 17 being provided cross-wise on the web, parallel to the feed direction F, where the label-gripping head 45 likewise grips the web cross-wise. Alternatively or in addition, adhesive-free regions could be provided length-wise beside one or both outer edges 24a and 24b of the web, allowing for the label-gripping head 45 to grip the labels length-wise.

The label-applying assembly 32 provides for multiple label-applying heads, which in turn provides that each label-applying head can serve just one lane, to achieve a higher throughput.

The label-cutting block 28 provides for severing the labels used for labeling all the articles in one label collecting and applying cycle synchronously, which also allows the label-cutting block to provide for severing the labels used for labeling all the articles in one label collecting and applying cycle simultaneously, providing for maximum label-severing speed.

Likewise, the label-applying assembly 32 also provides for labeling all the articles in one row synchronously, which also allows the label-applying assembly to provide for labeling all the articles in one row simultaneously, providing for maximum labeling speed.

For purposes herein, two events occur "simultaneously" when they occur at the same time within a variance of +/−1 millisecond, and "substantially simultaneously" when they occur at the same time within a variance of +/−5 milliseconds. Also for purposes herein, two events occur "synchronously" when they occur either simultaneously or at regularly spaced intervals within a variance of +/−1 millisecond, and "substantially synchronously" when they occur either substantially simultaneously or at regularly spaced intervals within a variance of +/−5 milliseconds.

In addition, the label-applying assembly 32 provides for laterally translating the label-applying heads, for changing the spacings between the label-applying heads, and for shifting the label-applying assembly from the label-cutting block 28 to the articles 10, and/or to operate it in the aforementioned mode 2.

The provision for changing the spacings between the label-applying heads allows for all the label-applying heads that are used for labeling articles in the same row to be supplied by the same web and therefore a single label supply as noted. The label-cutting block 28 further supports this feature.

The reason for changing the spacings between the label-applying heads is that the lateral spacings between the cut labels are inherently less than the corresponding lateral spacings between the articles (the label is smaller than the article). So the spacings between the label-applying heads are decreased to allow the label-applying heads to become (typically) centered over the labels, to pick up or collect labels from the label-cutting block 28, and the spacings are thereafter be increased to allow the label-applying heads to become (typically) centered over the articles to be labeled, to apply the labels to the articles.

In light of this reason, it can be seen that an alternative to adapting the label-applying assembly to provide for changing the spacings between the label-applying heads is to adapt the label-cutting block to provide for changing the spacings between the cut labels, in like manner.

However, adapting the label-applying assembly to allow for laterally translating the label-applying heads also provides for the operation noted above as mode 2, particularly that shown in connection with FIG. 13.

Mode 2 is advantageous over the alternative of providing label-applying heads dedicated to particular lanes because mode 2 requires only half as many active label-applying heads as there are lanes.

So it is advantageous to provide for laterally translating the label-applying heads in such a manner that will allow for maintaining the spacings between them, and it is additionally desirable to do so in a way that also allows for changing the spacings between them.

While the scissors-type linkage assemblies used in the preferred embodiment of the invention for adjusting the spacings between the label-applying heads are particularly adapted for use in labeling singulated articles, and more particularly articles that are equidistantly spaced apart from each other in rows, it is within the principles of the invention to provide each label-applying head with its own drive mechanism for individually adjusting the spacings between the heads as needed, on the fly, for labeling non-singulated, or (more or less) randomly distributed articles.

For purposes herein, a "conveyor" has a linear conveying direction that is the direction that articles on the conveyor are conveyed by the conveyor.

It is to be understood that, while a specific automated labeling method and apparatus has been shown and described as preferred, variations can be made, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A method for labeling articles with an automated labeling apparatus, the method comprising: providing a reel of adhesive labels to the automated labeling apparatus and thereafter by use of the automated labeling apparatus performing steps of drawing a web of the adhesive labels from the reel; synchronously collecting a plurality of the adhesive labels from the web; and synchronously applying the plurality of collected adhesive labels to a corresponding plurality of the articles.

2. The method of claim 1, wherein the step of synchronously collecting includes simultaneously collecting the plurality of adhesive labels, and wherein the step of synchronously applying includes simultaneously applying the plurality of collected adhesive labels.

3. The method of claim 2, wherein the step of simultaneously collecting includes simultaneously severing the plurality of adhesive labels.

4. The method of claim 1, wherein the step of synchronously collecting includes synchronously severing the plurality of adhesive labels.

5. The method of claim 4, wherein the adhesive labels are liner-less.

6. The method of claim 3, wherein the adhesive labels are liner-less.

7. The method of claim 2, wherein the adhesive labels are liner-less.

8. The method of claim 1, wherein the adhesive labels are liner-less.

* * * * *